US009423892B2

(12) United States Patent
Inaba et al.

(10) Patent No.: US 9,423,892 B2
(45) Date of Patent: Aug. 23, 2016

(54) INFORMATION INPUT DEVICE

(71) Applicants: Takehiko Inaba, Chita-gun (JP); Naoki Tanjima, Nissin (JP); Atsushi Kasugai, Nagoya (JP)

(72) Inventors: Takehiko Inaba, Chita-gun (JP); Naoki Tanjima, Nissin (JP); Atsushi Kasugai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 17 days.

(21) Appl. No.: 14/062,965

(22) Filed: Oct. 25, 2013

(65) Prior Publication Data

US 2014/0132533 A1    May 15, 2014

(30) Foreign Application Priority Data

Nov. 15, 2012  (JP) ................................. 2012-251678
Apr. 18, 2013  (JP) ................................. 2013-087649

(51) Int. Cl.
*G06F 3/0354*   (2013.01)
*G06F 3/041*    (2006.01)
*G06K 9/22*     (2006.01)

(52) U.S. Cl.
CPC ........... *G06F 3/03545* (2013.01); *G06F 3/041* (2013.01); *G06K 9/222* (2013.01)

(58) Field of Classification Search
CPC .................................................. G06F 3/03545
See application file for complete search history.

(56) References Cited

U.S. PATENT DOCUMENTS

| 4,910,696 | A | 3/1990 | Grossman et al. |
| 5,995,373 | A | 11/1999 | Nagai |
| 6,124,851 | A | 9/2000 | Jacobson |
| 2004/0044682 | A1 | 3/2004 | Nakamura et al. |
| 2005/0237313 | A1* | 10/2005 | Yoshida ........................ 345/183 |
| 2006/0262257 | A1 | 11/2006 | Hattori |
| 2007/0195009 | A1 | 8/2007 | Yamamoto et al. |
| 2010/0046187 | A1 | 2/2010 | Murakami |
| 2010/0073897 | A1 | 3/2010 | Tachikawa |
| 2011/0036648 | A1* | 2/2011 | Chen et al. ................ 178/18.03 |

FOREIGN PATENT DOCUMENTS

| CN | 201662795 U | 12/2010 |
| JP | S62-22879 U | 2/1987 |
| JP | H04-350714 A | 12/1992 |
| JP | H08-286809 A | 11/1996 |

(Continued)

OTHER PUBLICATIONS

Aug. 11, 2015—(US) Non-Final Office Action—U.S. Appl. No. 14/062,998.

(Continued)

*Primary Examiner* — Mark Regn
(74) *Attorney, Agent, or Firm* — Banner & Witcoff, Ltd.

(57) ABSTRACT

The information input device includes first detecting portion, second detecting portion, first positioning portion, second positioning portion, first information acquiring portion, and second information acquiring portion. The first information acquiring portion is configured to acquire information that is written on a paper sheet overlapping with a cover sheet positioned by the first positioning portion, based on the position of the writing tool detected by the first detecting portion. The second information acquiring portion is configured to acquire information that is written on a paper sheet overlapping with a cover sheet positioned by the second positioning portion, based on the position of the writing tool detected by the second detecting portion.

14 Claims, 20 Drawing Sheets

(56) References Cited

FOREIGN PATENT DOCUMENTS

| | | |
|---|---|---|
| JP | 2001056737 A | 2/2001 |
| JP | 2002-132943 A | 5/2001 |
| JP | 2005-215806 A | 8/2005 |
| JP | 2006-065701 A | 3/2006 |
| JP | 2007-128120 A | 5/2007 |
| JP | 2012-014411 A | 1/2012 |
| JP | 2012-014461 A | 1/2012 |

OTHER PUBLICATIONS

Co Pending U.S. Appl. No. 14/062,998, filed Oct. 25, 2013.
Mar. 1, 2016—(JP) Notification for Reasons for Rejection—App 2012-251678.
Mar. 28, 2016—(CN) Notification of First Office Action—App 201310511855.6.

* cited by examiner

FIG. 4
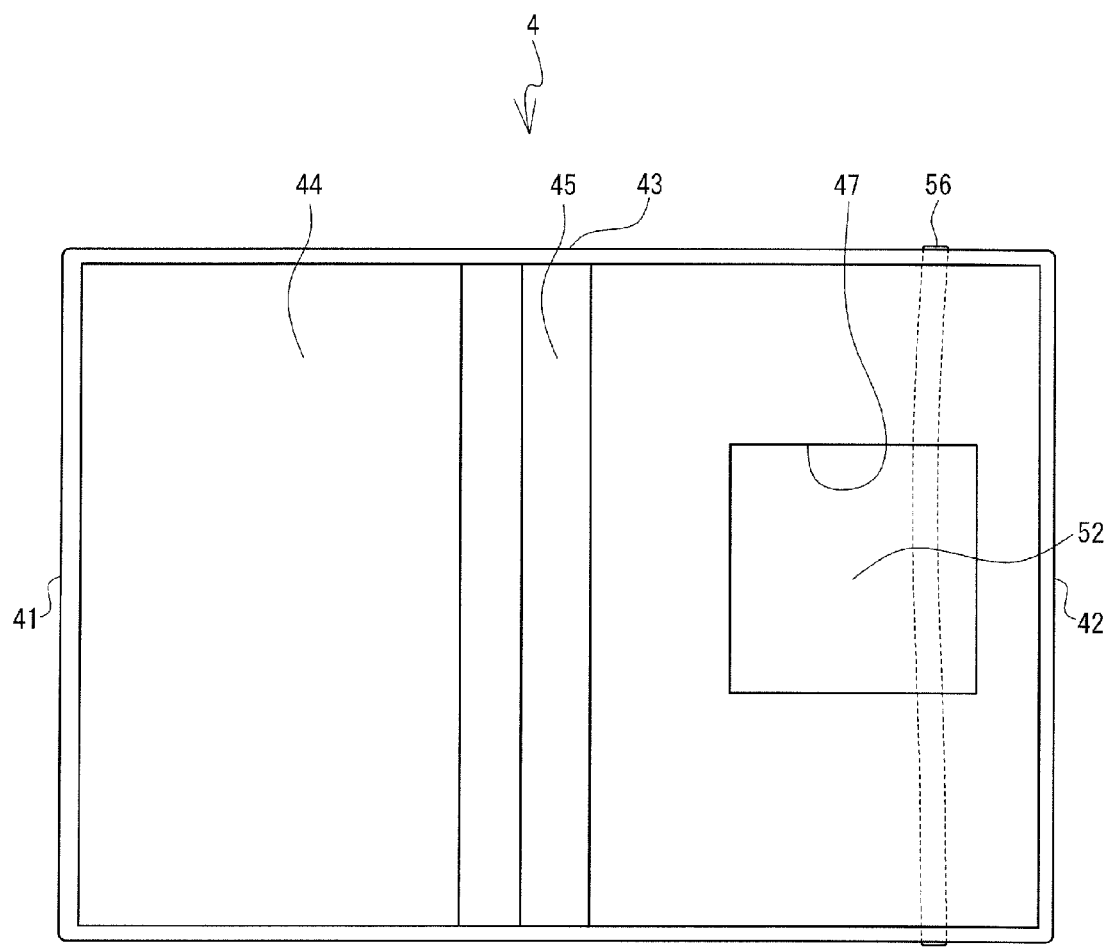
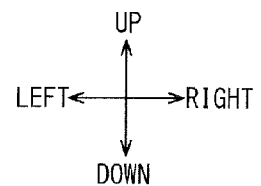

FIG. 12
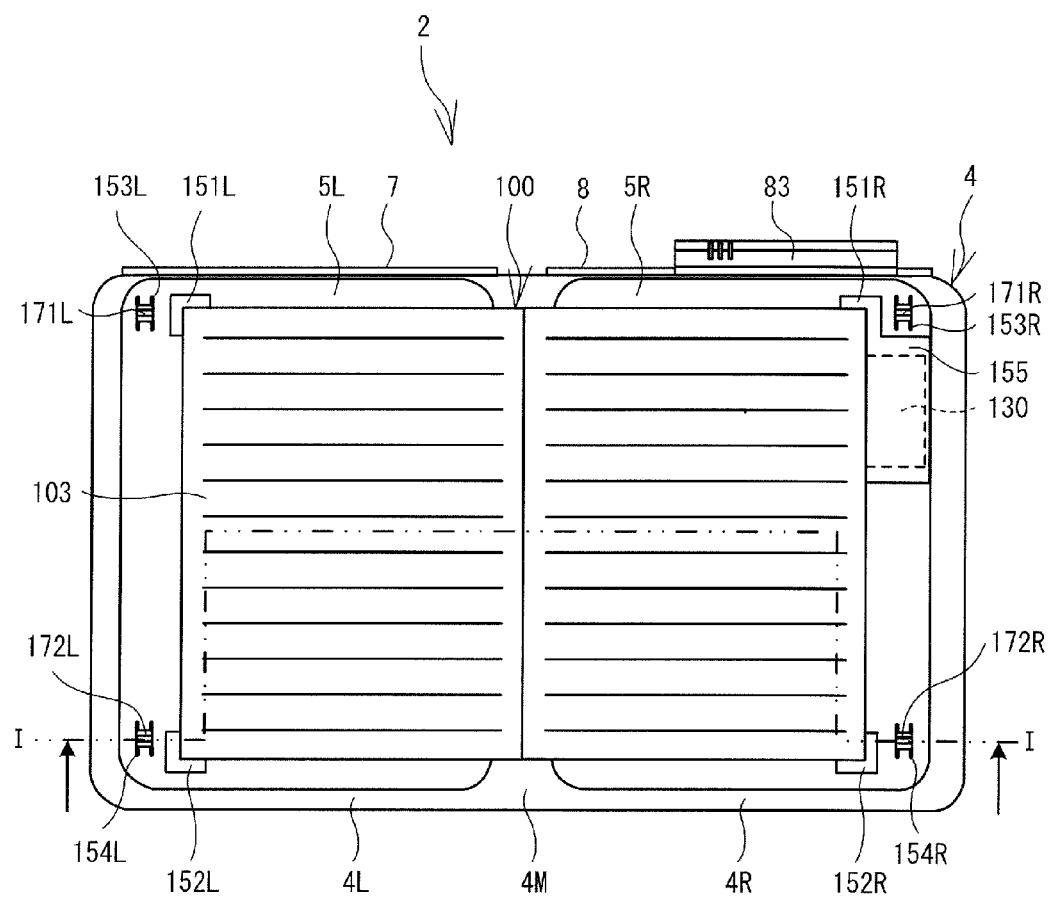
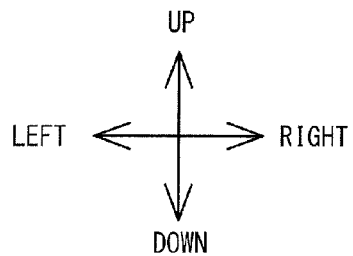

FIG. 13
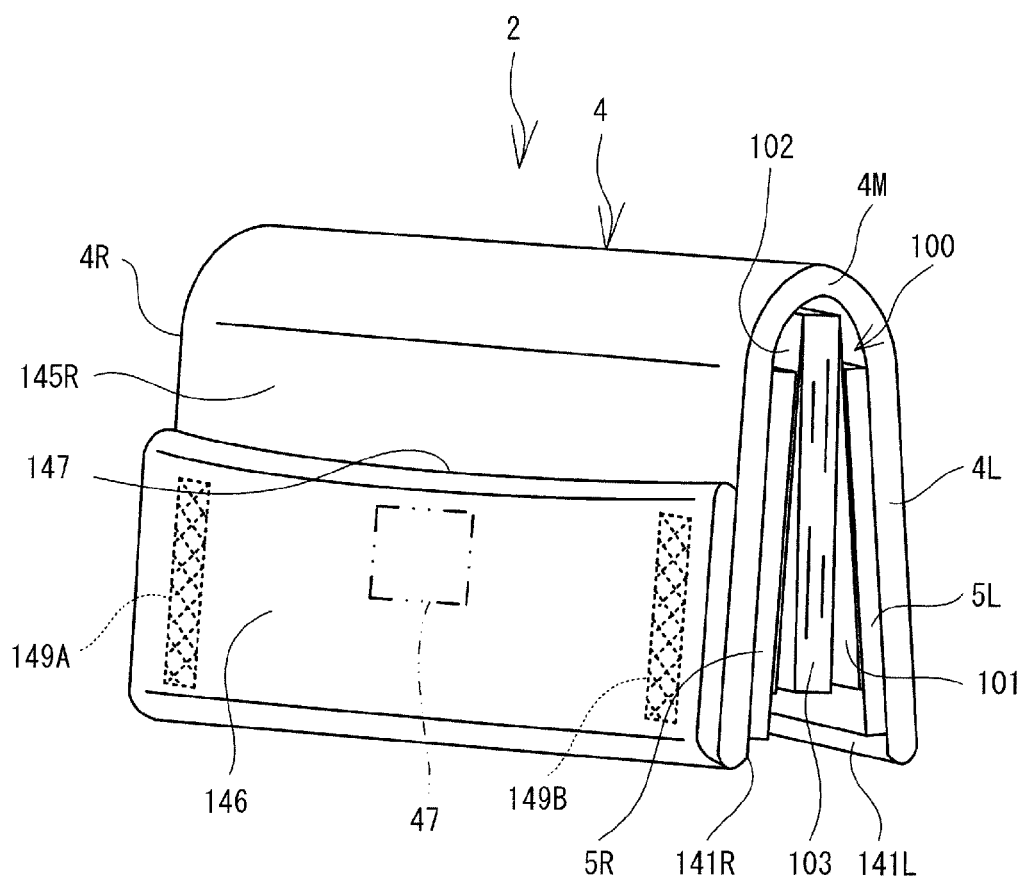
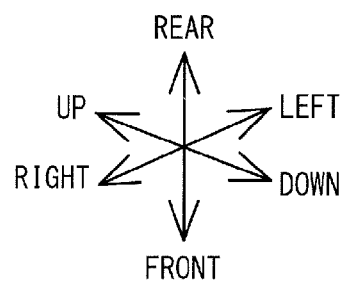

FIG. 16
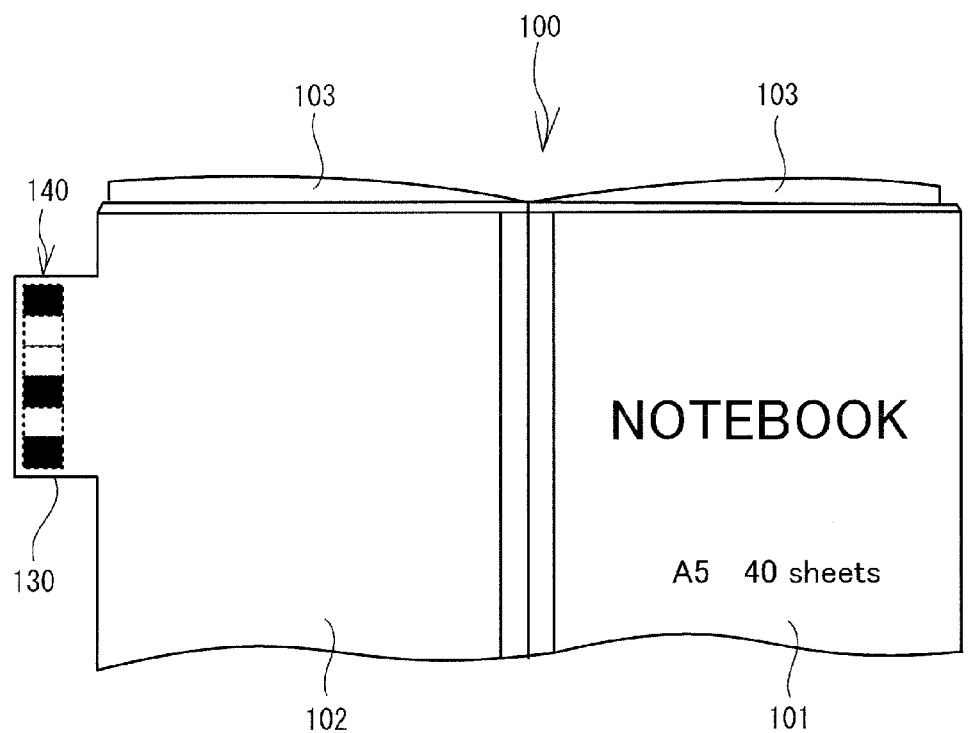
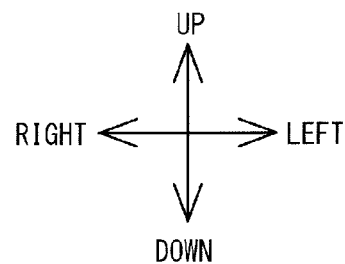

though the notebook is not fixed to the digitizer. Therefore, positional displacement of the notebook may occur on the digitizer when the content is being written. If the positional displacement of the notebook occurs on the digitizer, reproducibility of the content that is based on the image data read by the digitizer may deteriorate.

INFORMATION INPUT DEVICE

CROSS-REFERENCE TO RELATED APPLICATION

This application claims priority to Japanese Patent Application No. 2012-251678, filed Nov. 15, 2012, and Japanese Patent Application No. 2013-87649, filed Apr. 18, 2013. The disclosure of the foregoing applications is incorporated herein by reference in its entirety.

BACKGROUND

The present disclosure relates to an information input device that can acquire information input on a booklet-like recording medium in which a plurality of paper sheets are bound.

A technology is known that digitizes, stores and manages information that is written on a booklet-like paper medium in which a plurality of paper sheets are bound. For example, a person places a notebook on a pad of a digitizer and writes content by hand using a special pen. The hand-written content is read by the digitizer as image data, and is stored in a memory of a personal computer (PC).

SUMMARY

In the above-described information management system, the notebook is not fixed to the digitizer. Therefore, positional displacement of the notebook may occur on the digitizer when the content is being written. If the positional displacement of the notebook occurs on the digitizer, reproducibility of the content that is based on the image data read by the digitizer may deteriorate.

Various embodiments of the broad principles derived herein provide an information input device that is capable of suppressing occurrence of positional displacement of a booklet-like recording medium when writing is being performed on a paper sheet.

Various embodiments herein provide an information input device that is configured to acquire information that is input on a recording medium using a writing tool. The recording medium is in a booklet form in which a pair of cover sheets and a plurality of paper sheets stacked and arranged between the pair of cover sheets are bound. The information input device includes a first detecting portion, a second detecting portion, a first positioning portion, a second positioning portion, a first information acquiring portion, and a second information acquiring portion. The first detecting portion is configured to detect a position of the writing tool that is in proximity of the first detecting portion. The first detecting portion is a plate-shaped body that is configured to face almost a whole surface of a first cover sheet of the pair of cover sheets. The second detecting portion is configured to detect a position of the writing tool that is in proximity of the second detecting portion. The second detecting portion is connected to the first detecting portion via wiring and is a plate-shaped body that is configured to face almost a whole surface of a second cover sheet of the pair of cover sheets. The first positioning portion is configured to position the first cover sheet such that almost the whole surface of the first cover sheet faces the first detecting portion. The first positioning portion is provided on the first detecting portion. The second positioning portion is configured to position the second cover sheet such that almost the whole surface of the second cover sheet faces the second detecting portion. The second positioning portion is provided on the second detecting portion. The first information acquiring portion is configured to acquire information that is written on the paper sheet overlapping with the first cover sheet positioned by the first positioning portion, based on the position of the writing tool detected by the first detecting portion. The second information acquiring portion is configured to acquire information that is written on the paper sheet overlapping with the second cover sheet positioned by the second positioning portion, based on the position of the writing tool detected by the second detecting portion.

BRIEF DESCRIPTION OF THE DRAWINGS

Embodiments of the present disclosure will be described below in detail with reference to the accompanying drawings in which:

FIG. 4 is a front view of an exterior cover;

FIG. 12 is a front view of the reading device in an open state;

FIG. 13 is a perspective view of the reading device in a closed state;

FIG. 16 is a rear view of a notebook in an open state;

DETAILED DESCRIPTION

Figure 1:
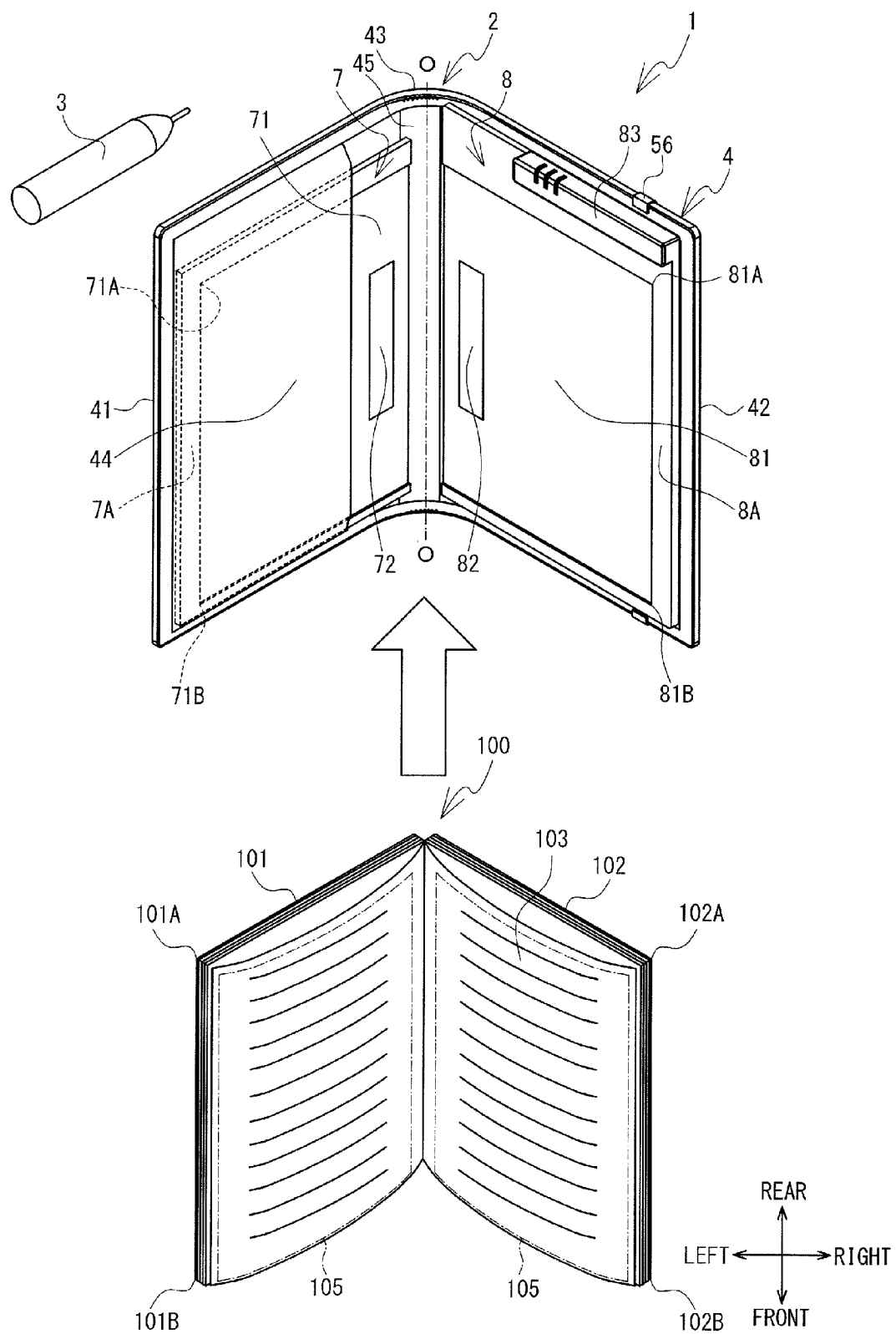
FIG. 1 is an overall configuration diagram of a handwriting input system according to a first embodiment.

Hereinafter, embodiments of the present disclosure will be explained with reference to the drawings. The drawings referred to are used to explain technological features that can be adopted by the present disclosure. Device configurations shown in the drawings are merely explanatory examples and are not intended to limit the present disclosure to only those examples.

1. First Embodiment

A handwriting input system 1 according to a first embodiment will be explained with reference to FIG. 1 to FIG. 9. In the explanation below, the upper side, the lower side, the left side and the right side of FIG. 1 respectively correspond to the rear side, the front side, the left side and the right side of the handwriting input system 1. The upper side, the lower side, the upper left side, the lower right side, the upper right side and the lower left side of FIG. 2 and FIG. 6 respectively correspond to the front side, the rear side, the left side, the right side, the upper side and the lower side of a reading device 2 or detection devices 7 and 8. The upper side, the lower side, the left side, the right side, the side to the front and the side to the back of FIG. 3 and FIG. 4 respectively correspond to the upper side, the lower side, the left side, the right side, the front side and the rear side of the reading device 2 or an exterior cover 4. The upper side, the lower side, the left side, the right side, the side to the front and the side to the back of FIG. 5 and FIG. 7 respectively correspond to the upper side, the lower side, the right side, the left side, the rear side and the front side of the exterior cover 4 or the detection devices 7 and 8.

1-1. Handwriting Input System 1

Figure 2:
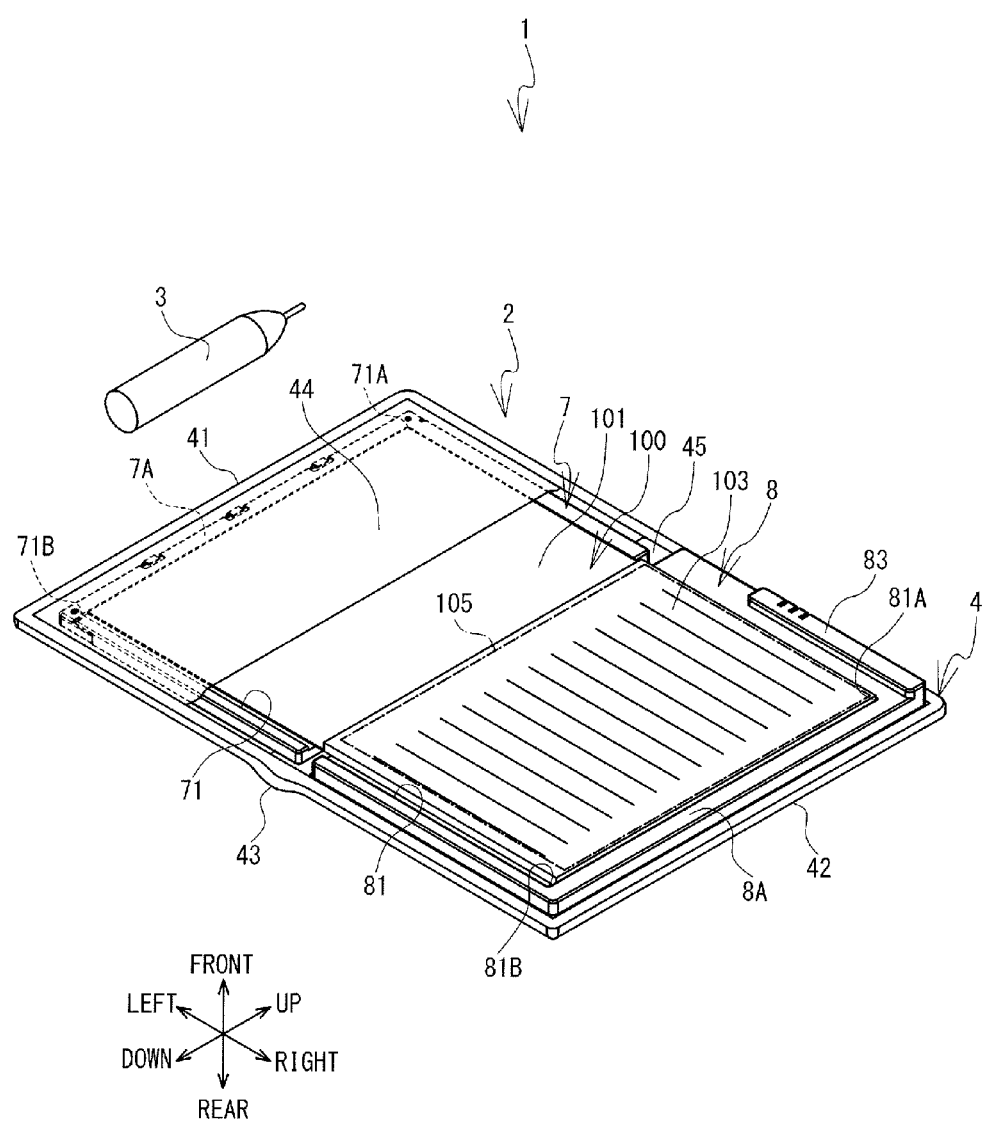
FIG. 2 is a perspective view of a reading device in an open state.

As shown in FIG. 1 and FIG. 2, the handwriting input system 1 is provided with the reading device 2, an electronic pen 3, a notebook 100 and the like. The reading device 2 is configured to be folded (namely, folded into two) in the left-right direction (refer to FIG. 8), and is a tablet type information input device that is configured to be carried by a user. The electronic pen 3 is a writing tool that is configured to be used to write information (characters, symbols, graphics, numbers and the like) on the notebook 100 using ink, and also be used to input written information to the reading device 2.

The notebook 100 is a booklet-like paper medium which is configured to be opened out to a two-page spread in the left-right direction, and in which a plurality of paper sheets 103 are bound between cover sheets 101 and 102. The cover sheets 101 and 102 and the plurality of paper sheets 103 are respectively bound at part of their edge portions. The notebook 100 is, for example, an A5 size notebook. The paper sheets 103 have a document format in which, for example, 20 ruled lines are drawn.

In the handwriting input system 1, the notebook 100 is fixed to a front surface of the reading device 2. The user opens the reading device 2, and uses the electronic pen 3 to write information on the paper sheet 103 of the notebook 100 fixed to the reading device 2. The reading device 2 detects a trajectory of the electronic pen 3, and acquires and stores stroke data. The stroke data is data that shows the trajectory of the electronic pen 3 based on a plurality of pieces of position information (coordinate information, for example) of the electronic pen 3 that are detected over time by the reading device 2.

The reading device 2 is capable of wireless communication with a PC (not shown in the drawings), for example. The stroke data acquired by the reading device 2 is transferred to the PC in accordance with, for example, a transfer instruction input by the user. Based on the stroke data transferred from the reading device 2, the PC is configured to generate and display an image file obtained by digitizing the information written on the notebook 100. Note that the transfer instruction can be input, for example, by a writing operation using the electronic pen 3.

1-2. Reading Device 2

Figure 3:
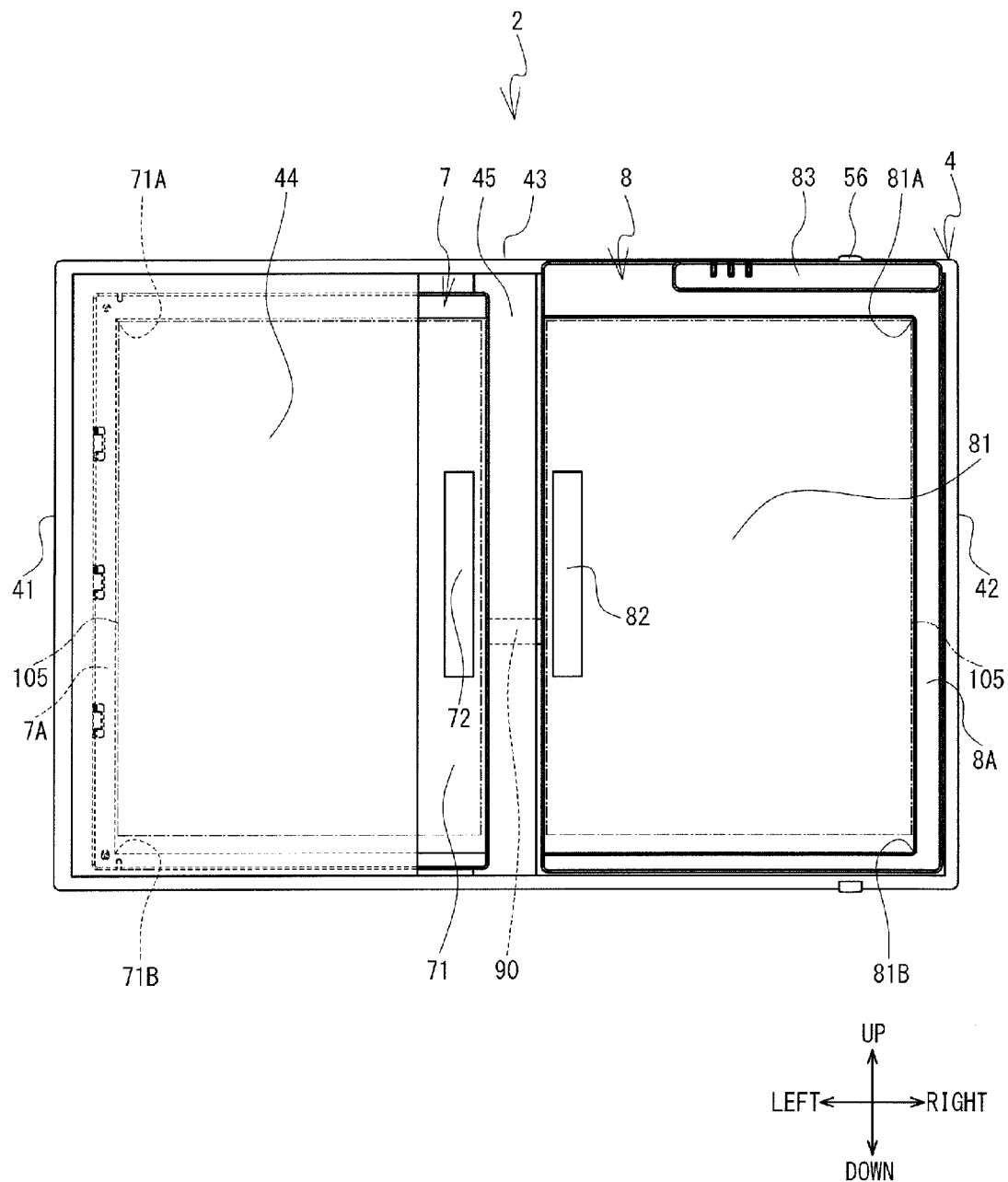
FIG. 3 is a front view of the reading device in an open state.

As shown in FIG. 1 to FIG. 3, the reading device 2 is provided with the exterior cover 4 and the pair of detection devices 7 and 8. The exterior cover 4 is configured to be folded in the left-right direction (refer to FIG. 8). The exterior cover 4 is, for example, made of artificial leather, a nylon material or a polyester material, and has flexibility such that the exterior cover 4 can be deformed in response to an external force. The detection devices 7 and 8 are input devices that are formed in a rectangular plate shape in a front view. The detection devices 7 and 8 are each attached to a front surface of the exterior cover 4 in an unfolded state such that the detection devices 7 and 8 are arranged side by side in the left-right direction. The detection devices 7 and 8 are mutually electrically connected via a harness 90 (refer to FIG. 3 and FIG. 7).

As shown in FIG. 3, when the reading device 2 is not folded (in other words, when the reading device 2 is in an open state), the detection device 7 is arranged on the left side and the detection device 8 is arranged on the right side. In this state, a left side cover portion 41 and a right side cover portion 42 (which will be described later) are arranged in parallel in the left-right direction. The notebook 100 is fixed to a front surface 7A of the detection device 7 and to a front surface 8A of the detection device 8 (refer to FIG. 2). The cover sheet 101 of the notebook 100 comes into contact with and is fixed to the front surface 7A of the detection device 7. The cover sheet 102 of the notebook 100 comes into contact with and is fixed to the front surface 8A of the detection device 8. Hereinafter, positional relationships between the respective portions will be explained based on the state in which the reading device 2 is opened.

1-3. Exterior Cover 4

Figure 5:
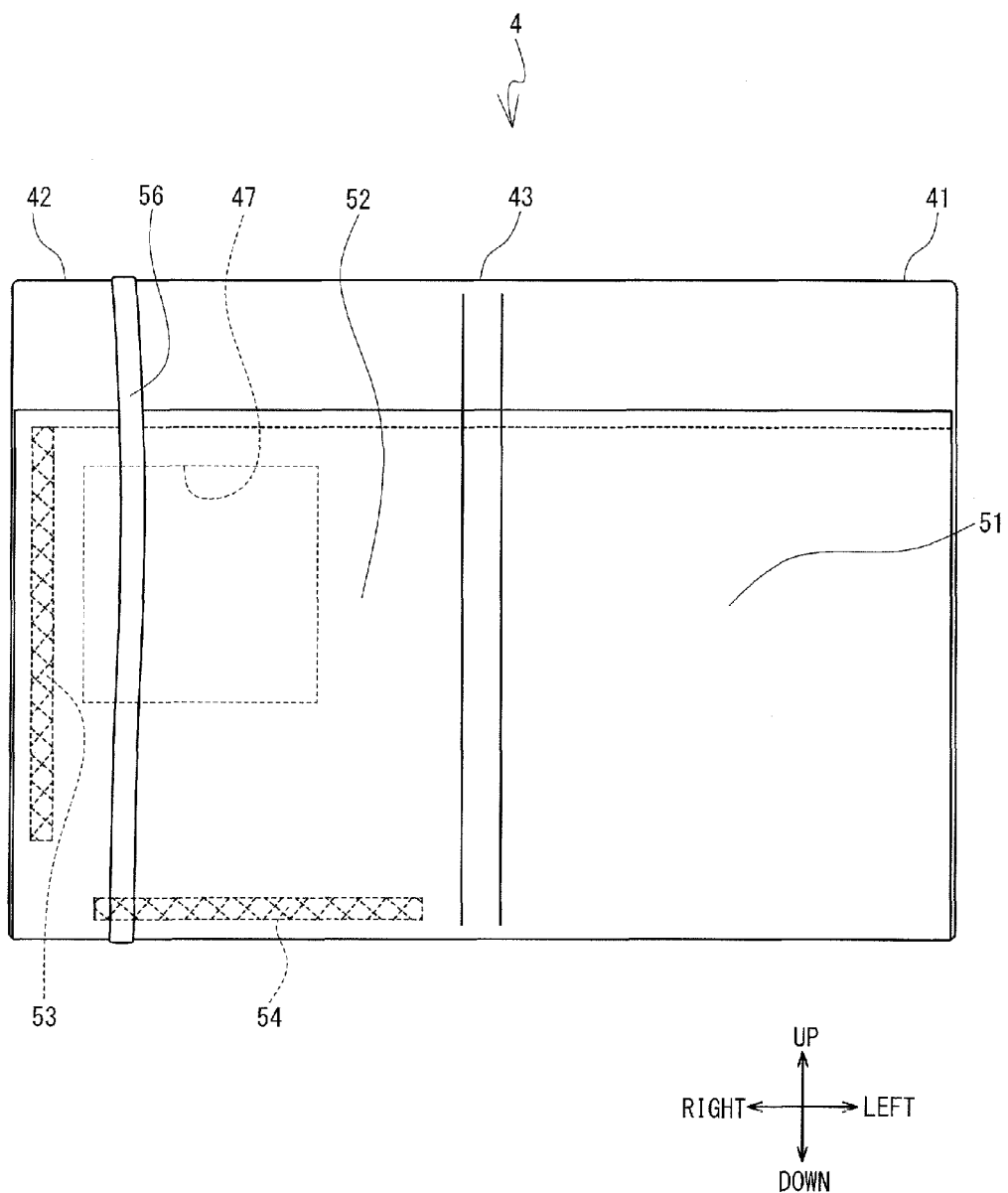
FIG. 5 is a rear view of the exterior cover.

As shown in FIG. 4 and FIG. 5, the exterior cover 4 has a rectangular shape that is long in the left-right direction when the exterior cover 4 is not folded. The exterior cover 4 is provided with the left side cover portion 41, the right side cover portion 42 and a central portion 43. The left side cover portion 41 and the right side cover portion 42 have a rectangular shape that is long in the up-down direction in a front view. Antistatic resin plates (not shown in the drawings) are enclosed inside the left side cover portion 41 and the right side cover portion 42, respectively.

The left side cover portion 41 and the right side cover portion 42 are coupled to each other in the left-right direction via the central portion 43 that extends in the up-down direction. The central portion 43 is configured to bend between the left side cover portion 41 and the right side cover portion 42. The left side and the right side of the left side cover portion 41 respectively correspond to the free end side and the binding side of the left side cover portion 41. The right side and the left side of the right side cover portion 42 respectively correspond to the free end side and the binding side of the right side cover portion 42.

The structure of the front surface of the exterior cover 4 will be explained. As shown in FIG. 4, a holding sheet 44 is provided on the front surface of the left side cover portion 41. The holding sheet 44 is a transparent resin sheet having a rectangular shape in a front view. The upper edge, the lower edge and the left edge of the holding sheet 44 are sealed with respect to the front surface of the left side cover portion 41. The holding sheet 44 forms a pocket that opens on the right side. The left edge of the holding sheet 44 is located in the vicinity of the left edge of the left side cover portion 41. The right edge of the holding sheet 44 is separated from the central portion 43 of the exterior cover 4 to the left. The detection device 7 is configured to be inserted into the inner side of the holding sheet 44 from the right side (refer to FIG. 3).

A resin sheet (not shown in the drawings) is adhered over the front surface of the right side cover portion 42. A back surface of the detection device 8 is fixed by adhesive to the front surface of the right side cover portion 42 via the resin sheet (refer to FIG. 3). A rectangular opening 47 is provided substantially in the center of the right side cover portion 42. Although not shown in the drawings, an opening having the same shape as the opening 47 is also provided substantially in the center of the resin sheet. The opening 47 is provided in a position corresponding to a battery mounting portion 20 and a name plate attachment portion 25 (refer to FIG. 7) that will be described later.

A band-shaped body 45 is provided on the front surface of the central portion 43. The band-shaped body 45 is a strip member that extends in the up-down direction, and is made of the same material as the exterior cover 4. Both ends in the up-down direction of the band-shaped body 45 are respectively fixed to the upper edge and the lower edge of the central portion 43. As shown in FIG. 3, the harness 90 that connects the detection devices 7 and 8 is arranged between the band-shaped body 45 and the central portion 43, and is hidden behind the band-shaped body 45. Therefore, it is possible to protect the harness 90 from the outside, and it is also possible to improve the appearance of the reading device 2.

The structure of the back surface of the exterior cover 4 will be explained. As shown in FIG. 5, a rectangular-shaped first pocket 51 is provided on the back surface of the left side cover portion 41. The width (the length in the left-right direction) of the first pocket 51 is substantially the same as the width of the left side cover portion 41. The height (the length in the up-down direction) of the first pocket 51 is approximately three-quarters of the height of the left side cover portion 41. The right edge, the left edge and the lower edge of the first pocket 51 are sealed with respect to the back surface of the left side cover portion 41. The first pocket 51 opens on the upper side. For example, a writing tool or a document can be inserted into the first pocket 51 from above the first pocket 51.

A second pocket 52 that is configured to cover the opening 47 is provided on a back surface of the right side cover portion 42. The second pocket 52 has a rectangular shape that is substantially the same shape as the first pocket 51. The left edge of the second pocket 52 is sealed with respect to the back surface of the central portion 43. The right edge of the second pocket 52 is configured to be attached to and removed from the back surface of the right side cover portion 42 by means of a fastener portion 53. The lower edge of the second pocket 52 is configured to be attached to and removed from the back surface of the right side cover portion 42 by means of a fastener portion 54. When the second pocket 52 is fixed to the back surface of the right side cover portion 42 by the fastener portions 53 and 54, the second pocket 52 opens on the upper side. Similarly to the first pocket 51, a writing tool or a document, for example, can be inserted into the second pocket 52 from above the second pocket 52.

Figure 9:
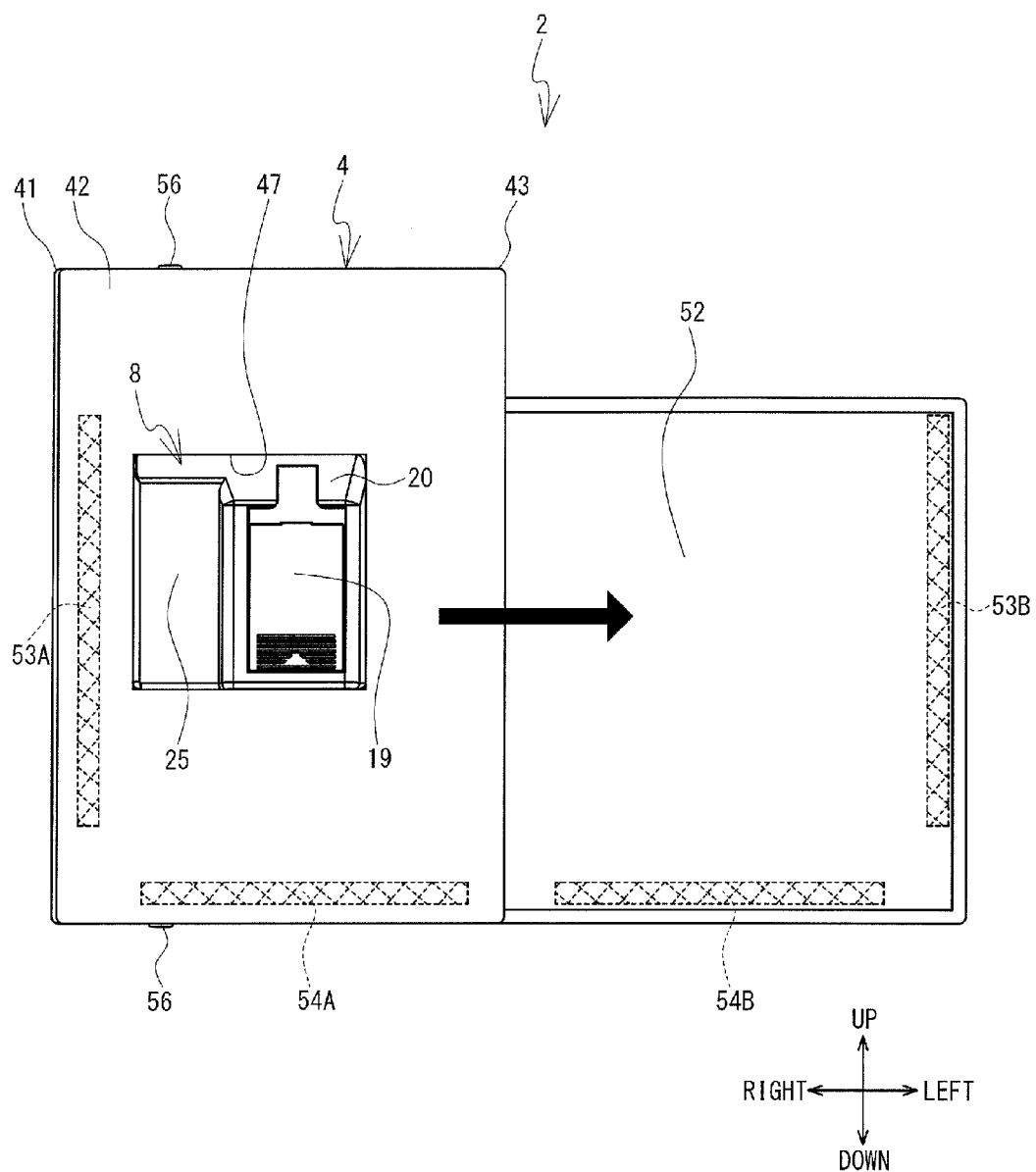
FIG. 9 is a rear view of the reading device in a state in which a second pocket is detached.

As shown in FIG. 9, the fastener portion 53 includes surface fasteners 53A and 53B. The fastener portion 54 includes surface fasteners 54A and 54B. The surface fastener 53A is provided on the right side of the opening 47 on the back surface of the right side cover portion 42. The surface fastener 53B is provided on the back surface of the second pocket 52, in a position corresponding to the surface fastener 53A. The surface fastener 54A is provided on the lower edge side of the back surface of the right side cover portion 42. The surface fastener 54B is provided on the back surface of the second pocket 52, in a position corresponding to the surface fastener 54A.

The user can detach the second pocket 52, which is fixed by the fastener portions 53 and 54, from the back surface of the right side cover portion 42 to the left. When the second pocket 52 is detached from the back surface of the right side cover portion 42, the opening 47 is exposed. The battery mounting portion 20 and the name plate attachment portion 25 (which will be described later) are arranged in the opening 47.

As shown in FIG. 5, a strip-shaped band 56 that extends in the up-down direction is provided on the right edge side of the right side cover portion 42. The band 56 is made of an elastic material (rubber, for example). Both ends in the longitudinal direction of the band 56 are respectively fixed to the upper edge and the lower edge of the right side cover portion 42. In a state in which the exterior cover 4 is opened, the user puts the band 56 over the second pocket 52 by passing the band 56 over to the back side of the right side cover portion 42. It is thus possible to suppress the second pocket 52 from spontaneously opening, for example, when the reading device 2 is being used.

Figure 8:
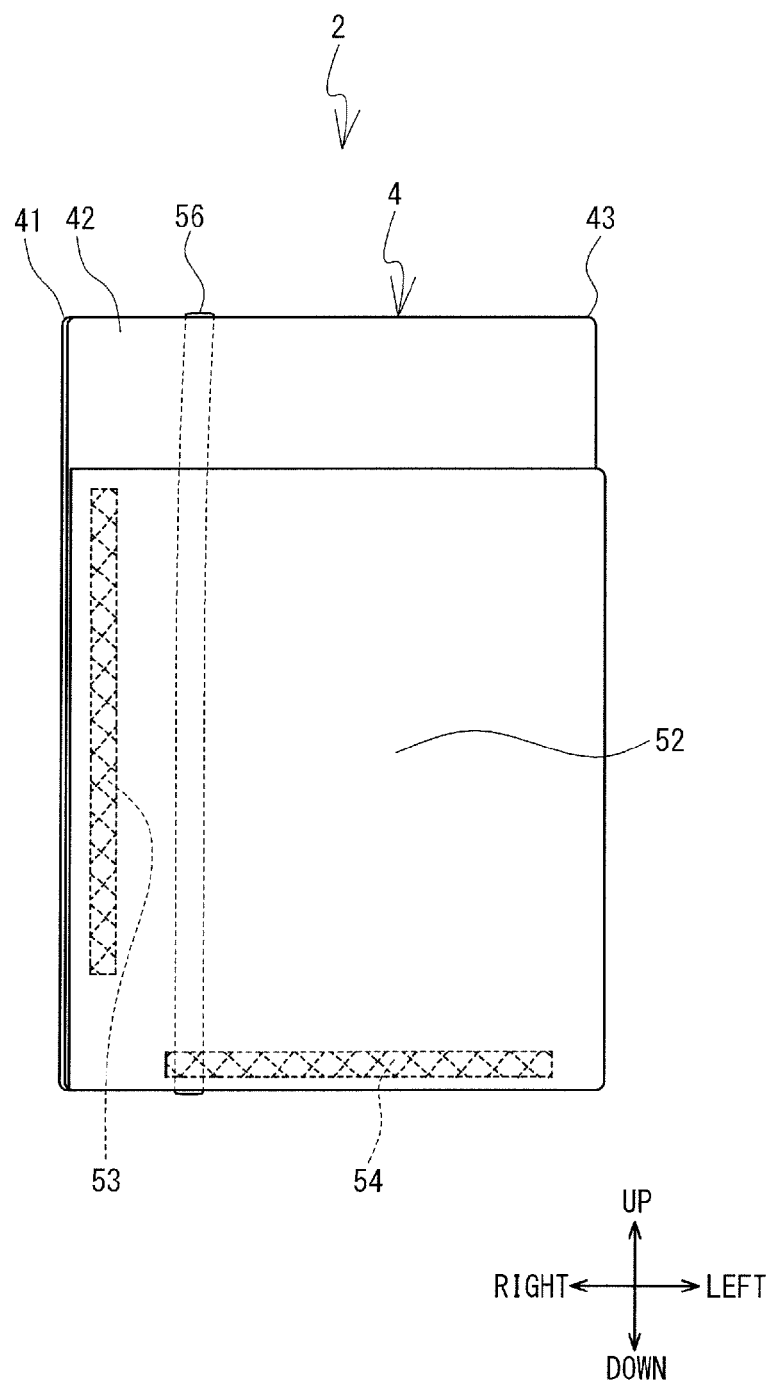
FIG. 8 is a rear view of the reading device in a closed state.

As shown in FIG. 8, in a state in which the reading device 2 is folded (namely, in a state in which the reading device 2 is closed), the user passes the band 56 over to the back side of the left side cover portion 41 so as to bundle the right side cover portion 42 and the left side cover portion 41 together. It is thus possible to suppress the exterior cover 4 from spontaneously opening, for example, when the user is carrying the reading device 2.

1-4. Detection Devices 7 and 8

As shown in FIG. 3, both the detection devices 7 and 8 are plate-shaped input devices having a rectangular shape that is vertically long in a front view and having a small thickness in the front-rear direction. The left side and the right side of the detection device 7 respectively correspond to the free end side and the binding side of the detection device 7. The right side and the left side of the detection device 8 respectively correspond to the free end side and the binding side of the detection device 8.

Figure 6:
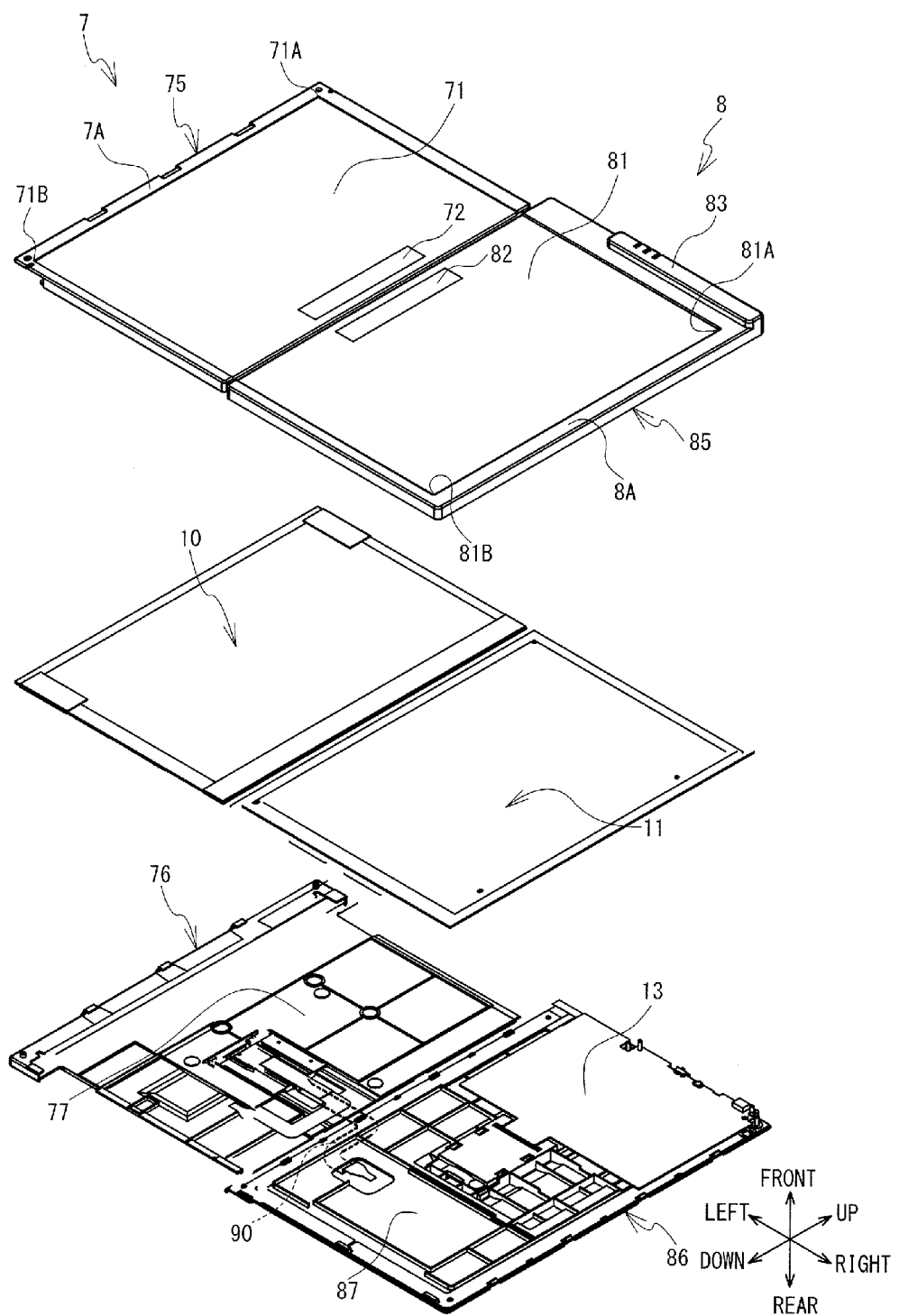
FIG. 6 is an exploded perspective view of detection devices.

As shown in FIG. 6, the detection device 7 is provided with a front cover 75, a digitizer board 10, a rear cover 76 and the like. The front cover 75 and the rear cover 76 are resin plates having a vertically long substantially rectangular shape. A board arrangement portion 77 is provided on the front surface of the rear cover 76, and electronic components, such as the digitizer board 10, are arranged on the board arrangement portion 77. The front cover 75 is assembled to the rear cover 76 in a state in which the electronic components, such as the digitizer board 10, are arranged on the board arrangement portion 77.

As shown in FIG. 3 and FIG. 6, a recessed portion 71 that is a rearwardly recessed area is provided in the front surface 7A of the front cover 75. The recessed portion 71 has a rectangular shape that corresponds to almost the whole of the cover sheet 101, except a binding side part of the cover sheet 101 (refer to FIG. 1) of the notebook 100. In the present embodiment, the length in the up-down direction of the recessed portion 71 is slightly larger than the length in the up-down direction of the notebook 100.

The recessed portion 71 is provided with positioning portions 71A and 71B. The positioning portion 71A is provided in the upper left corner of the recessed portion 71, and has a right angle shape corresponding to an upper left corner 101A (refer to FIG. 1) of the cover sheet 101. The positioning portion 71B is provided in the lower left corner of the recessed portion 71, and has a right angle shape corresponding to a lower left corner 101B (refer to FIG. 1) of the cover sheet 101. An adhesive portion 72 is provided in the vicinity of the right edge of the recessed portion 71. The adhesive portion 72 is a strip-shaped adhesive portion that is formed by a light adhesive, for example. The adhesive portion 72 adheres to the cover sheet 101 that is positioned with respect to the recessed portion 71.

As shown in FIG. 6, the detection device 8 is provided with a front cover 85, a digitizer board 11, a main board 13, a rear cover 86 and the like. The front cover 85 and the rear cover 86 are resin plates having a vertically long substantially rectangular shape. A board arrangement portion 87 is provided on the front surface of the rear cover 86, and electronic components, such as the digitizer board 11 and the main board 13, are arranged on the board arrangement portion 87. The front cover 85 is assembled to the rear cover 86 in a state in which the electronic components, such as the digitizer board 11 and the main board 13, are arranged on the board arrangement portion 87. A switch housing portion 83 is provided on an upper portion of the front surface of the front cover 85. The switch housing portion 83 houses various switch components (not shown in the drawings) that are provided on the main board 13.

As shown in FIG. 3 and FIG. 6, a recessed portion 81 that is a rearwardly recessed area is provided on the front surface 8A of the front cover 85. The recessed portion 81 has a rectangular shape that corresponds to almost the whole of the cover sheet 102, except a binding side part of the cover sheet 102 (refer to FIG. 1) of the notebook 100. In the present embodiment, the length in the up-down direction of the recessed portion 81 is slightly larger than the length in the up-down direction of the notebook 100.

The recessed portion 81 is provided with positioning portions 81A and 81B. The positioning portion 81A is provided in the upper right corner of the recessed portion 81, and has a right angle shape corresponding to an upper right corner 102A (refer to FIG. 1) of the cover sheet 102. The positioning portion 81B is provided in the lower right corner of the recessed portion 81, and has a right angle shape corresponding to a lower right corner 102B (refer to FIG. 1) of the cover sheet 102. An adhesive portion 82 is provided in the vicinity of the left edge of the recessed portion 81. The adhesive portion 82 is a strip-shaped adhesive portion that is formed by a light adhesive, for example. The adhesive portion 82 adheres to the cover sheet 102 that is positioned with respect to the recessed portion 81.

Figure 7:
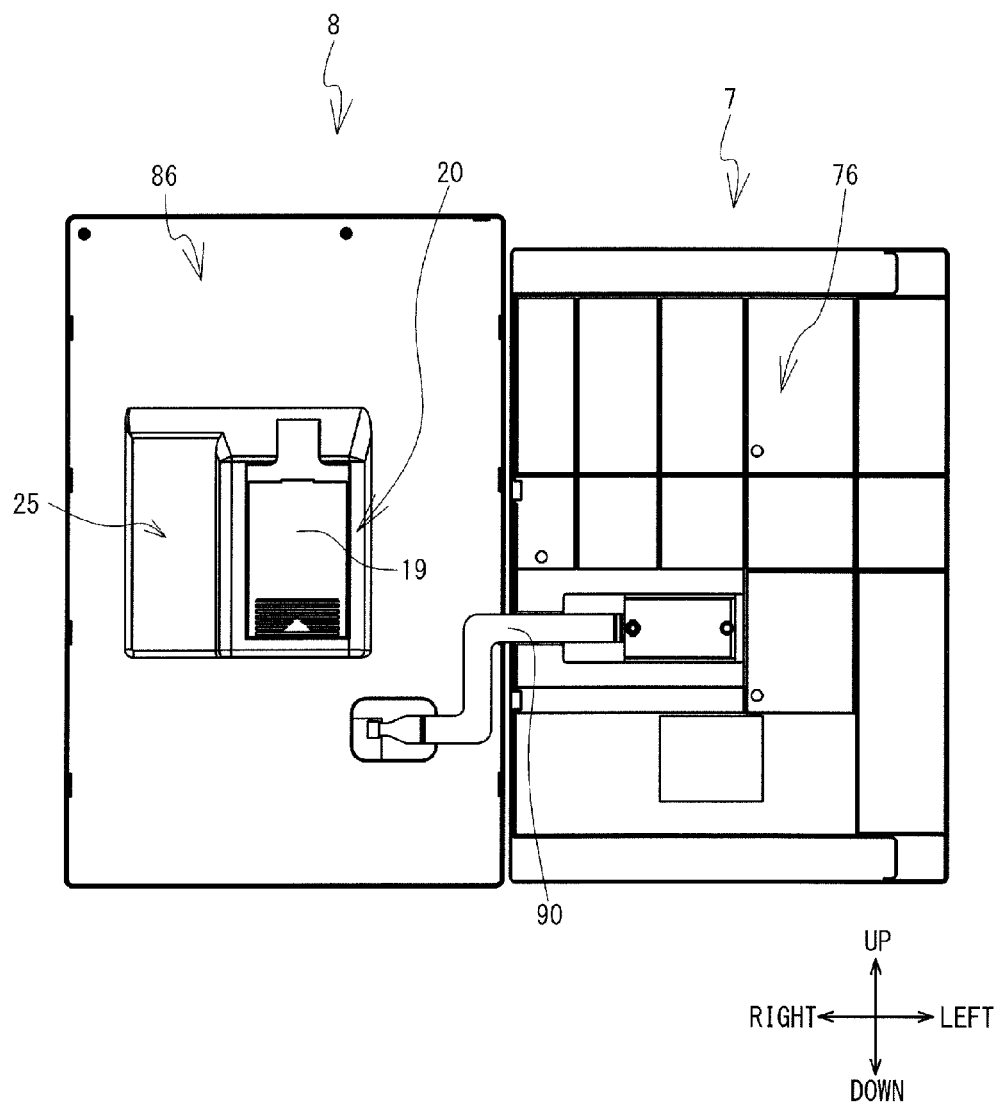
FIG. 7 is a rear view of the detection devices.

As shown in FIG. 7, the battery mounting portion 20 and the name plate attachment portion 25 are provided substantially in the center of the back surface of the rear cover 86. The battery mounting portion 20 and the name plate attachment portion 25 are adjacent to each other in the left-right direction. The battery mounting portion 20 protrudes rearward from the back surface of the rear cover 86. A battery (not shown in the drawings) that supplies power to the detection devices 7 and 8 is configured to be mounted inside the battery mounting portion 20. A battery cover 19 is attached to the battery mounting portion 20 such that it blocks the inside of the battery mounting portion 20. The name plate attachment portion 25 protrudes rearward from the back surface of the rear cover 86 by an amount corresponding to the thickness of the right side cover portion 42 (refer to FIG. 4). The name plate attachment portion 25 is a portion to which a name plate (not shown in the drawings) of the reading device 2 is attached. The name plate is, for example, a compact plate or a seal on which the brand (specification) of the reading device 2 is displayed.

As shown in FIG. 6, each of the digitizer boards 10 and 11 is a board on which many long and thin loop coils are arrayed in each of the X axis direction (the left-right direction in the present embodiment) and the Y axis direction (the up-down direction in the present embodiment). Each of the digitizer boards 10 and 11 has a rectangular shape that is long in the up-down direction, and has a size that corresponds to almost the whole surface of each of the detection devices 7 and 8. The digitizer boards 10 and 11 each have a detection range that is configured to face almost the whole paper surface of the cover sheets 101 and 102, except the binding side of the cover sheets 101 and 102. The digitizer board 10 detects a position of the electronic pen 3 (refer to FIG. 1) that is in proximity of the digitizer board 10 over time, using a known electromagnetic induction method. The digitizer board 11 detects a position of the electronic pen 3 (refer to FIG. 1) that is in proximity of the digitizer board 11 over time, using the known electromagnetic induction method.

The main board 13 is provided with a CPU, a flash ROM and a wireless communication portion that are not shown in the drawing. The CPU performs control of the reading device 2 and generates stroke data based on position information detected by the digitizer boards 10 and 11. The flash ROM stores various programs that are executed by the CPU to control the reading device 2. The flash ROM stores the stroke data generated by the CPU. The wireless communication portion is a controller to perform near-field wireless communication with an external electronic device (a PC, for example).

1-5. Attachment Procedure of Detection Devices 7 and 8

The procedure for attaching the detection devices 7 and 8 to the exterior cover 4 will be explained. An operator opens the exterior cover 4 as shown in FIG. 3. In a state in which the recessed portion 71 is directed in the forward direction, the operator inserts the detection device 7 from the right side into the inner side of the holding sheet 44 provided on the front surface of the left side cover portion 41. The detection device 7 is held on the inner side of the holding sheet 44. Next, the operator passes the harness 90 through between the front surface of the central portion 43 and the band-shaped body 45. The detection device 7 and the detection device 8 are connected by the harness 90 (refer to FIG. 7).

Next, the operator fixes the back surface of the detection device 8 to the front surface of the right side cover portion 42 of the exterior cover 4, using a bonding agent. At this time, the operator inserts the battery mounting portion 20 and the name plate attachment portion 25 into the inside of the opening 47 that is provided in the right side cover portion 42. As a result, the detection devices 7 and 8 are arranged side by side in the left-right direction. The detection device 7 is configured to move on the inner side of the holding sheet 44 in a direction in which the detection device 7 approaches the detection device 8 and in a direction in which the detection device 7 separates from the detection device 8.

As shown in FIG. 3, the left edge of the detection device 8 does not overlap with the right edge of the band-shaped body 45. When the exterior cover 4 is closed, there is no interference between the left edge of the detection device 8 and the right edge of the band-shaped body 45. In a state in which the detection device 7 is inserted into the inner side of the holding sheet 44, the right edge of the detection device 7 overlaps with the left edge of the band-shaped body 45. Even when the detection device 7 moves in the direction in which the detection device 7 approaches the detection device 8 and in the direction in which the detection device 7 separates from the detection device 8 in accordance with opening and closing of the reading device 2, the right edge of the detection device 7 is unlikely to get caught up by the left edge of the band-shaped body 45. As described above, the operation of attaching the detection devices 7 and 8 to the exterior cover 4 is complete, and the reading device 2 is completely formed.

As shown in FIG. 9, the battery mounting portion 20 and the name plate attachment portion 25 are inserted into the inside of the opening 47 that is provided in the right side cover portion 42. The thickness of the battery mounting portion 20 and the name plate attachment portion 25 is substantially the same as the thickness of the right side cover portion 42. Therefore, the overall thickness of the reading device 2 is reduced. When the operator opens the second pocket 52, the battery mounting portion 20 and the name plate attachment portion 25 are exposed to the outside via the opening 47. The user can attach and remove the battery to and from the battery mounting portion 20 without removing the detection device 8 from the right side cover portion 42. The user can confirm the information on the name plate (not shown in the drawings) that is attached to the name plate attachment portion 25.

1-6. Attachment Procedure of Notebook 100

The procedure for attaching the notebook 100 to the detection devices 7 and 8 will be explained. As shown in FIG. 3, the user opens the reading device 2 horizontally and places the reading device 2 on a desk. On the front surface of the exterior cover 4, the detection device 7 is arranged on the left side and the detection device 8 is arranged on the right side, respectively. As shown in FIG. 1 and FIG. 2, the user inserts the cover sheet 101 of the notebook 100 into a clearance between the holding sheet 44 and the recessed portion 71 of the detection device 7, from the right side. The right edge of the holding sheet 44 is separated from the adhesive portion 72 to the left. Therefore, the holding sheet 44 does not adhere to the adhesive portion 72. The user can easily insert the cover sheet 101 into the clearance between the holding sheet 44 and the recessed portion 71.

The user can adjust the position of the cover sheet 101 while verifying the cover sheet 101 that is located behind the transparent holding sheet 44. If the user pushes the upper left corner 101A of the cover sheet 101 against the positioning portion 71A, the user can position the upper left corner 101A with respect to the positioning portion 71A.

Since the positioning portion 71A is covered by the holding sheet 44, warping is unlikely to occur in the upper left corner 101A. The user can reliably position the upper left corner 101A with respect to the positioning portion 71A.

The holding sheet 44 covers the left side cover portion 41 from the vicinity of the left edge of the left side cover portion 41 to the near side of the adhesive portion 72. The cover sheet 101 inserted into the clearance between the holding sheet 44 and the recessed portion 71 is guided to the left side by the holding sheet 44. The user can easily push the upper left corner 101A against the positioning portion 71A.

After the upper left corner 101A is positioned by the positioning portion 71A, the user causes the cover sheet 101 to gradually come into contact with the recessed portion 71 from the free end side toward the binding side. Since the cover sheet 101 is adhered to the adhesive portion 72, the cover sheet 101 is reliably fixed to the recessed portion 71.

Next, the user positions and fixes the cover sheet 102 of the notebook 100 with respect to the recessed portion 81 of the detection device 8. At this time, in accordance with the thickness of the notebook 100, the user causes the detection device 7, to which the cover sheet 101 has already been fixed, to move toward the detection device 8. The user pushes the upper right corner 102A of the cover sheet 102 against the positioning portion 81A of the recessed portion 81, and thereby performs positioning. The user causes the cover sheet 102 to gradually come into contact with the recessed portion 81 from the free end side toward the binding side. Since the cover sheet 102 is adhered to the adhesive portion 82, the cover sheet 102 is reliably fixed to the recessed portion 81.

With the above-described procedure, the operation of attaching the notebook 100 to the detection devices 7 and 8 is complete. The user can perform writing on the notebook 100 using the electronic pen 3. As shown in FIG. 2, in a state in which the notebook 100 is attached to the detection devices 7 and 8, a slight gap is generated between the lower edge of the notebook 100 and each of the lower edges of the recessed portions 71 and 81. The user can push the upper left corner 101A and the upper right corner 102A against the positioning portions 71A and 81A, which are located above the recessed portions 71 and 81, from below. It is thus possible to improve operation efficiency in positioning the notebook 100 with respect to the detection devices 7 and 8, and also to absorb a dimension error of the notebook 100.

1-7. Positional Relationship Between Notebook 100 and Detection Devices 7 and 8

The positional relationship between the notebook 100 and the detection devices 7 and 8 will be explained. As shown in FIG. 6, the detection range of the digitizer board 10 of the detection device 7 is almost the whole area of the digitizer board 10. The detection range of the digitizer board 11 of the detection device 8 is almost the whole area of the digitizer board 11. The recessed portion 71 of the detection device 7 is located within the detection range of the digitizer board 10. The recessed portion 81 of the detection device 8 is located within the detection range of the digitizer board 11.

As shown in FIG. 1, the paper sheets 103 that are stacked on the cover sheet 101 that is positioned in the recessed portion 71 are arranged on the detection device 7 side. A writable range 105 (refer to FIG. 1 and FIG. 3) of the paper sheets 103 stacked on the cover sheet 101 is located within the detection range of the digitizer board 10 (refer to FIG. 6). The paper sheets 103 that are stacked on the cover sheet 102 that is positioned in the recessed portion 81 are arranged on the detection device 8 side. The writable range 105 of the paper sheets 103 stacked on the cover sheet 102 is located within the detection range of the digitizer board 11. The writable range 105 is, for example, almost the whole of each of the paper sheets 103 except the binding side of the paper sheets 103. The detection devices 7 and 8 can reliably detect information that is written within the writable range 105 using the electronic pen 3.

The cover sheets 101 and 102 are fixed to the recessed portions 71 and 81 by the adhesive portions 72 and 82. The position of the notebook 100 with respect to the detection devices 7 and 8 is unlikely to be displaced when information is being written on the paper sheet 103. The detection devices 7 and 8 can acquire accurate stroke data of the electronic pen 3 written on the paper sheet 103.

In accordance with the opening and closing of the reading device 2 to which the notebook 100 is fixed, the notebook 100 is also opened and closed. When the notebook 100 is closed, the cover sheet 101 slightly moves in a direction in which the cover sheet 101 separates from the cover sheet 102. When the notebook 100 is opened, the cover sheet 101 slightly moves in a direction in which the cover sheet 101 approaches the cover sheet 102. It is desirable that the distance between the detection devices 7 and 8 changes in accordance with the movement of the cover sheets 101 and 102 of the notebook 100 that is opened and closed.

In the present embodiment, although the detection device 8 is fixed to the exterior cover 4, the detection device 7 can move in accordance with the movement of the cover sheet 101. More specifically, the detection device 7 held by the holding sheet 44 can move in the direction in which the detection device 7 approaches the detection device 8 and in the direction in which the detection device 7 separates from the detection device 8. Since the detection device 7 can appropriately move in accordance with the movement of the cover sheet 101, the positional relationship between the notebook 100 and the detection devices 7 and 8 is constantly maintained. Even after the reading device 2 is closed and opened, the detection devices 7 and 8 can accurately acquire information written on the paper sheet 103.

1-8. Examples of Effects of First Embodiment

In the reading device 2 of the first embodiment, the cover sheet 101 is positioned by the recessed portion 71 such that almost the whole surface of the cover sheet 101 faces the detection device 7. The cover sheet 102 is positioned by the recessed portion 81 such that almost the whole surface of the cover sheet 102 faces the detection device 8. Based on the position of the electronic pen 3 detected by the detection device 7, the information that is written on the paper sheet 103 overlapping with the cover sheet 101 is acquired. Based on the position of the electronic pen 3 detected by the detection device 8, the information that is written on the paper sheet 103 overlapping with the cover sheet 102 is acquired. By doing this, the pair of cover sheets 101 and 102 are positioned with respect to the pair of detection devices 7 and 8 that are mutually independent. It is thus possible to suppress the occurrence of positional displacement of the booklet-like notebook 100 when information is being written on the paper sheet 103 that overlaps with either the cover sheet 101 or the cover sheet 102.

The recessed portion 71 is provided in the front surface 7A of the detection device 7 on which the cover sheet 101 is arranged. The positioning portion 71A of the recessed portion 71 positions the upper left corner 101A of the cover sheet 101 such that the writable range 105 of the paper sheet 103 overlapping with the cover sheet 101 corresponds to the detection range of the detection device 7. The recessed portion 81 is provided in the front surface 8A of the detection device 8 on which the cover sheet 102 is arranged. The positioning portion 81A of the recessed portion 81 positions the upper right corner 102A of the cover sheet 102 such that the writable range 105 of the paper sheet 103 overlapping with the cover sheet 102 corresponds to the detection range of the detection device 8. The exterior cover 4 includes the left side cover portion 41 and the right side cover portion 42. The left side cover portion 41 covers the back surface of the detection device 7. The right side cover portion 42 covers the back surface of the detection device 8 and is fixed to the back surface of the detection device 8. The holding sheet 44 is provided facing the left side cover portion 41. The detection device 7 can be inserted and held between the holding sheet 44 and the left side cover portion 41, and the holding sheet 44 covers the positioning portion 71A of the detection device 7 that has been inserted and held.

As a result of this, the positioning portions 71A and 81A perform positioning of the cover sheets 101 and 102 such that the writable range 105 of the paper sheets 103 corresponds to the detection range of the detection devices 7 and 8. The detection devices 7 and 8 can reliably acquire the information written on the paper sheets 103. Since the holding sheet 44 covers the positioning portion 71A, it is possible to suppress lifting of the cover sheet 101 that is inserted between the detection device 7 and the holding sheet 44. The user can easily position the cover sheet 101 with respect to the positioning portion 71A.

The recessed portion 71 is provided in the front surface 7A of the detection device 7, and has a concave shape that corresponds to the cover sheet 101. The recessed portion 81 is provided in the front surface 8A of the detection device 8, and has a concave shape that corresponds to the cover sheet 102. The user can easily position the cover sheets 101 and 102 with respect to the detection devices 7 and 8.

The holding sheet 44 is a resin sheet. The user can easily insert the cover sheet 101 between the detection device 7 and the holding sheet 44. The holding sheet 44 is transparent. The user can easily position the cover sheet 101 with respect to the positioning portion 71A.

The holding sheet 44 has a rectangular shape with closed three sides that are different from the right side from which the detection device 7 is inserted. It is thus possible to inhibit the detection device 7 from slipping out from the holding sheet 44 to the outside.

The adhesive portion 72 fixes the cover sheet 101 to the front surface 7A of the detection device 7. The adhesive portion 82 fixes the cover sheet 102 to the front surface 8A of the detection device 8. It is thus possible to suppress the positional displacement of the cover sheets 101 and 102 arranged on the detection devices 7 and 8. The user can easily attach and detach the cover sheets 101 and 102 to and from the detection devices 7 and 8 owing to the adhesive portions 72 and 82 that are formed by adhesive.

The adhesive portion 72 is provided on the right edge (which faces the detection device 8) of the detection device 7. The adhesive portion 82 is provided on the left edge (which faces the detection device 7) of the detection device 8. Thus, the user can fix the cover sheets 101 and 102 to the detection devices 7 and 8 in a stable manner.

The holding sheet 44 is provided in a position where the holding sheet 44 does not come into contact with the adhesive portion 72 of the detection device 7 that has been inserted and held between the holding sheet 44 and the left side cover portion 41. It is thus possible to inhibit the holding sheet 44 from adhering to the adhesive portion 72 of the detection device 7.

1-9. Modified Examples etc.

Modifications are possible insofar as they do not depart from the spirit and the scope of the present disclosure. For example, the positioning portions 71A, 71B, 81A and 81B may be L-shaped protrusions, for example.

The positioning portions 71B and 81B may position the lower left corner 101B of the cover sheet 101 and the lower right corner 102B of the cover sheet 102.

The detection devices 7 and 8 may include a touch panel. It is preferable that the driving method of the touch panel is a resistance film method. The notebook 100 may be placed on the touch panel. When information is written on the paper sheet 103 of the notebook 100, the detection devices 7 and 8 may use the touch panel to detect the position where the writing pressure of the electronic pen 3 is applied.

The adhesive portions 72 and 82 may be surface fasteners. The size, the format, the material and the like of the notebook 100 can be changed.

2. Second Embodiment

Figure 10:
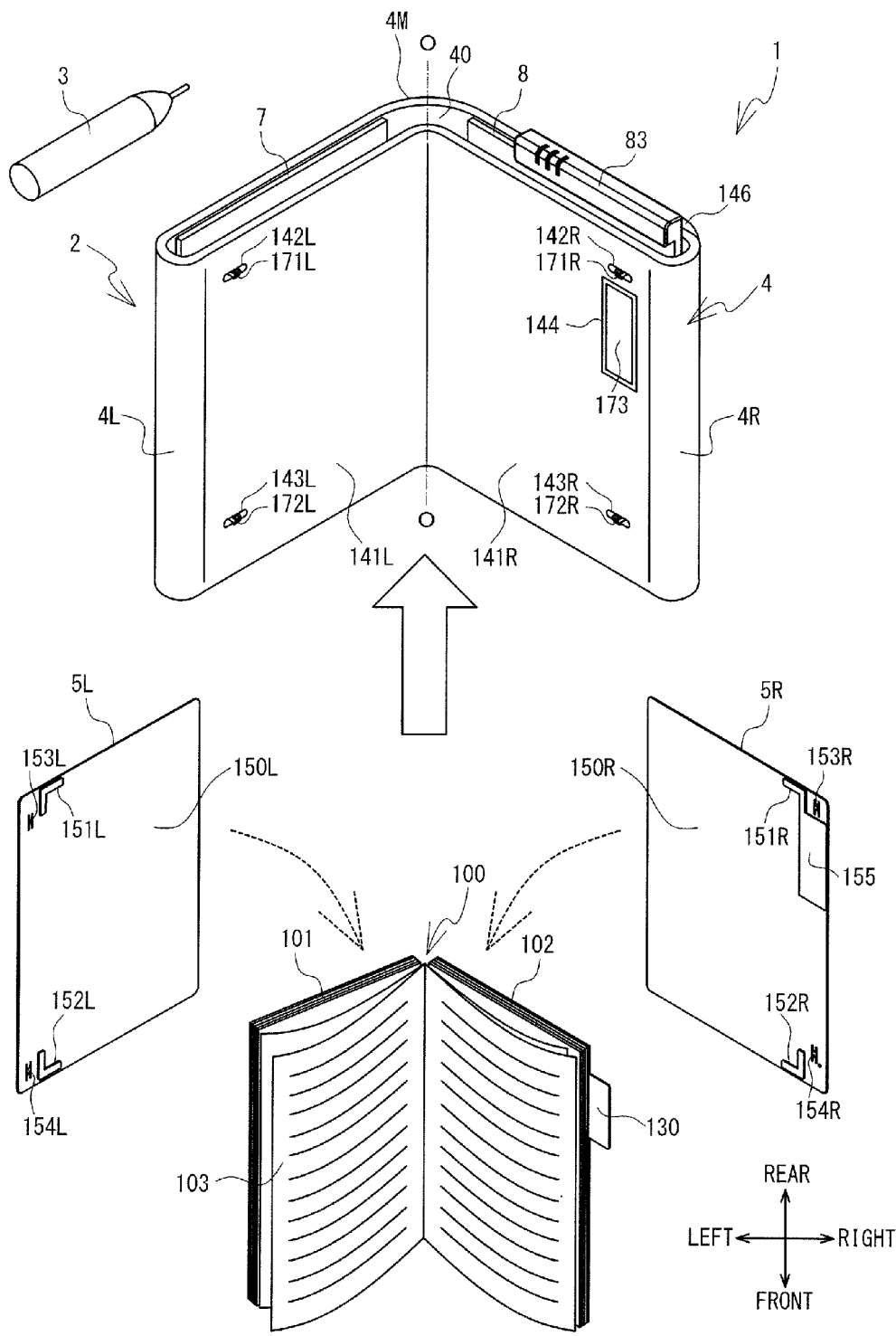
FIG. 10 is an overall configuration diagram of the handwriting input system according to a second embodiment.
Figure 11:
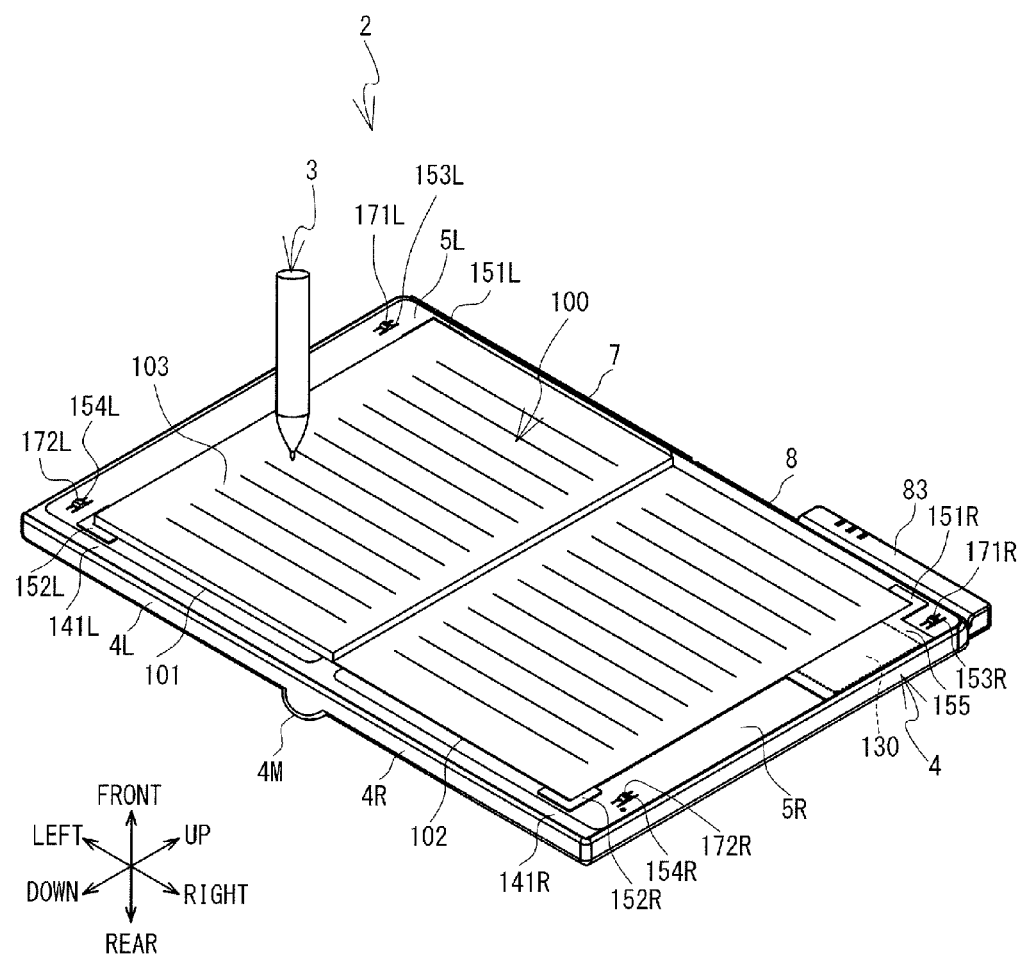
FIG. 11 is a perspective view of the reading device in an open state.

The handwriting input system 1 according to a second embodiment will be explained with reference to FIG. 10 to FIG. 20. Hereinafter, points that are difference from the first embodiment are mainly explained. As shown in FIG. 10, the handwriting input system 1 of the present embodiment includes the reading device 2, the electronic pen 3, a pair of medium holding sheets 5L and 5R, the notebook 100 and the like. The pair of medium holding sheets 5L and 5R are plate-shaped members that are used to attach the notebook 100 to the reading device 2. In the reading device 2, the pair of detection devices 7 and 8 are housed inside the flexible exterior cover 4 such that the pair of detection devices 7 and 8 are arranged side by side in the left-right direction.

2-1. Exterior Cover 4

As shown in FIG. 10 to FIG. 13, the exterior cover 4 is a bag body having a rectangular shape which is long in the left-right direction when the exterior cover 4 is not folded, and in which three sides (different from the upper side) are sealed. The exterior cover 4 has a housing opening 40 that opens upward. Since the exterior cover 4 is made of, for example, artificial leather or nylon material, the exterior cover 4 has flexibility such that it can be deformed in response to an external force.

The detection devices 7 and 8 are housed inside the exterior cover 4 via the housing opening 40 such that they are separated from each other. The detection device 7 is arranged in a left side section 4L of the exterior cover 4. The detection device 8 is arranged in a right side section 4R of the exterior cover 4. The clearance between the detection devices 7 and 8 is located in a central section 4M in the left-right direction of the exterior cover 4. The exterior cover 4 is configured such that the right side section 4R and the left side section 4L can be mutually opened and closed centering around the central section 4M.

The detection devices 7 and 8 are arranged side by side inside the exterior cover 4. The detection devices 7 and 8 are configured to rotate around an axis line O (specifically, a line extending in the up-down direction between the detection devices 7 and 8) that extends between the detection devices 7 and 8. The detection devices 7 and 8 are configured to move in a direction in which they approach each other and a direction in which they separate from each other, with the axis line O interposed therebetween.

When the exterior cover 4 is closed, a front surface 141L of the left side section 4L and a front surface 141R of the right side section 4R face each other. Guide holes 142L and 143L, which are through holes that are long in the left-right direction, are respectively provided in an upper left section and a lower left section of the front surface 141L. Guide holes 142R and 143R, which are through holes that are long in the left-right direction, are respectively provided in an upper right section and a lower right section of the front surface 141R. A sensor window 144, which is a rectangular cut-out that is long in the up-down direction, is provided below the guide hole 142R in the front surface 141R.

As shown in FIG. 13, an opening/closing cover 146 is provided on a rear surface 145R of the right side section 4R. The opening/closing cover 146 has a rectangular shape that is long in the up-down direction, and covers at least the opening 47. The battery mounting portion 20 (refer to FIG. 15) is arranged in the opening 47. The right side of the opening/closing cover 146 is joined to the right side of the right side section 4R. The upper side and the lower side of the opening/closing cover 146 are respectively attached to surface fasteners 149A and 149B that are provided on the rear surface 145R. A space encompassed by the opening/closing cover 146 and the rear surface 145R is a housing pocket 147 that is configured to house an object from the left side of the opening/closing cover 146. When the opening/closing cover 146 is detached from the surface fasteners 149A and 149B, the battery mounting portion 20 that has been covered by the opening/closing cover 146 is exposed to the outside (refer to FIG. 18).

2-2. Detection Devices 7 and 8

Figure 14:
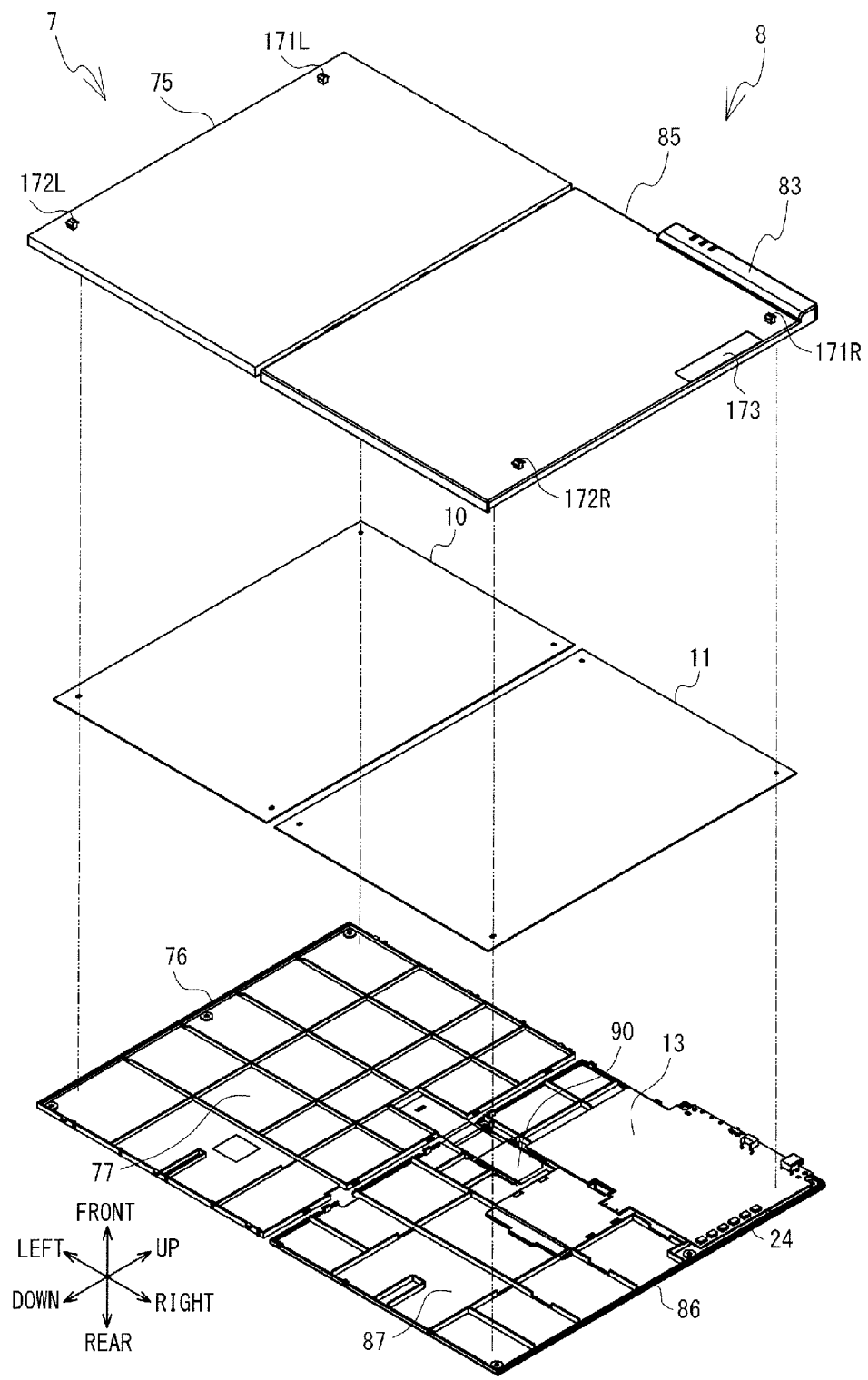
FIG. 14 is an exploded perspective view of the detection devices.
Figure 15:
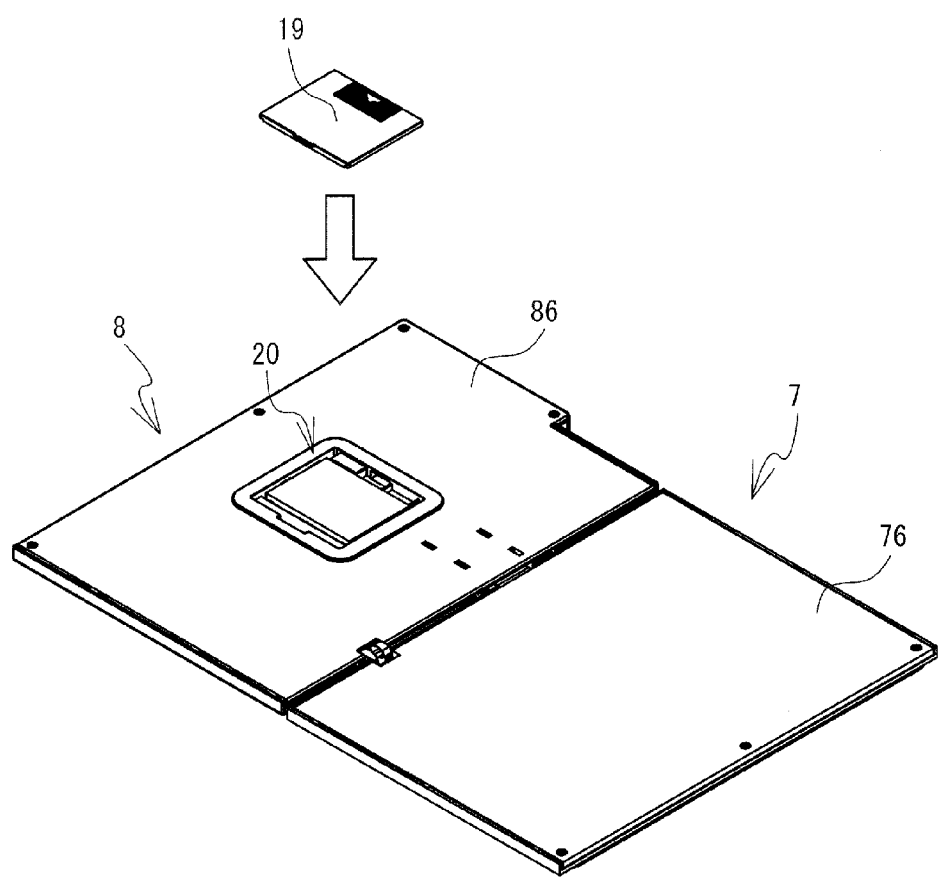
FIG. 15 is a perspective view of the detection devices.

As shown in FIG. 14, two attachment portions 171L and 172L are provided on the front surface of the front cover 75 of the detection device 7. The attachment portions 171L and 172L are respectively provided in the upper left corner and the lower left corner of the front cover 75. The attachment portions 171L and 172L are members that are used to couple and fix the medium holding sheet 5L. Each of the attachment portions 171L and 172L of the present embodiment is a hook-shaped body that protrudes forward. The attachment portions 171L and 172L extend forward further than the front surface 141L via the guide holes 142L and 143L, respectively. The attachment portions 171L and 172L position the cover sheet 101 such that almost the whole surface of the cover sheet 101 (refer to FIG. 10) faces the digitizer board 10.

Two attachment portions 171R and 172R are provided on the front surface of the front cover 85 of the detection device 8. The attachment portions 171R and 172R are respectively provided in the upper right corner and the lower right corner of the front cover 85. The attachment portions 171R and 172R are members that are used to couple and fix the medium holding sheet 5R. Each of the attachment portions 171R and 172R of the present embodiment is a hook-shaped body that protrudes forward. The attachment portions 171R and 172R extend forward further than the front surface 141R via the guide holes 142R and 143R, respectively. The attachment portions 171R and 172R position the cover sheet 102 such that almost the whole surface of the cover sheet 102 (refer to FIG. 10) faces the digitizer board 11.

A reading window 173 is provided in the front cover 85. The reading window 173 is provided below the attachment portion 171R and covers the front side of a sensor portion 24. The reading window 173 is a transparent plate which has a rectangular shape that is long in the up-down direction, and through which light emitted from the sensor portion 24 can be transmitted. The sensor portion 24 is provided on the main board 13. In a state in which the cover sheet 102 is positioned by the attachment portions 171R and 172R, the sensor portion 24 can optically read information from an image pattern provided on the cover sheet 102. The sensor portion 24 of the present embodiment includes a plurality of optical sensors that is configured to read an identification marker 140 (refer to FIG. 16) that is provided on a tag portion 130 of the cover sheet 102.

2-3. Medium Holding Sheets 5L and 5R

As shown in FIG. 10, the medium holding sheets 5L and 5R are prepared for each paper sheet size of the notebook 100. The medium holding sheets 5L and 5R of the present embodiment are specific to the A5 size notebook 100.

The medium holding sheet 5L is a resin plate that is used to fix the cover sheet 101 to the front surface 141L of the reading device 2. The cover sheet 101 is configured to be fixed to a front surface 150L of the medium holding sheet 5L such that the cover sheet 101 is in surface contact with the front surface 150L. The medium holding sheet 5L is provided with positioning portions 151L and 152L that are plate-shaped bodies having a substantially L-shape, and two coupling holes 153L and 154L that penetrate in the front-rear direction. The coupling hole 153L is provided in the upper left corner of the medium holding sheet 5L. The coupling hole 154L is provided in the lower left corner of the medium holding sheet 5L. The coupling holes 153L and 154L are cut out in a substantially H-shape in a front view, and the attachment portions 171L and 172L is configured to be coupled and fixed to the coupling holes 153L and 154L, respectively.

The positioning portions 151L and 152L are respectively provided to the right of the coupling holes 153L and 154L in the front surface 150L. The positioning portion 151L is a member that is used to position the upper left corner of the cover sheet 101. The positioning portion 152L is a member that is used to position the lower left corner of the cover sheet 101. The cover sheet 101 is adhered to the front surface 150L in a state in which the cover sheet 101 is arranged in an area located to the right of the positioning portions 151L and 152L.

In a front view, the coupling holes 153L and 154L do not overlap with the cover sheet 101 positioned by the positioning portions 151L and 152L. When the attachment portions 171L and 172L are coupled and fixed to the coupling holes 153L and 154L, there is no interference between the attachment portions 171L and 172L and the cover sheet 101 that is adhered to the front surface 150L.

The medium holding sheet 5R is a resin plate that is used to fix the cover sheet 102 to the front surface 141R of the reading device 2. The cover sheet 102 is configured to be fixed to a front surface 150R of the medium holding sheet 5R such that the cover sheet 102 is in surface contact with the front surface 150R. The medium holding sheet 5R is provided with positioning portions 151R and 152R that are plate-shaped bodies having a substantially L-shape, and two coupling holes 153R and 154R that penetrate in the front-rear direction. The coupling hole 153R is provided in the upper right corner of the medium holding sheet 5R. The coupling hole 154R is provided in the lower right corner of the medium holding sheet 5R. The coupling holes 153R and 154R are cut out in a substantially H-shape in a front view, and the attachment portions 171R and 172R is configured to be coupled and fixed to the coupling holes 153R and 154R, respectively.

The positioning portions 151R and 152R are respectively provided to the left of the coupling holes 153R and 154R in the front surface 150R. The positioning portion 151R is a member that is used to position the upper right corner of the cover sheet 102. The positioning portion 152R is a member that is used to position the lower right corner of the cover sheet 102. The cover sheet 102 is adhered to the front surface 150R in a state in which the cover sheet 102 is arranged in an area located to the left of the positioning portions 151R and 152R.

In a front view, the coupling holes 153R and 154R do not overlap with the cover sheet 102 positioned by the positioning portions 151R and 152R. When the attachment portions 171R and 172R are coupled and fixed to the coupling holes 153R and 154R, there is no interference between the attachment portions 171R and 172R and the cover sheet 102 that is adhered to the front surface 150R.

A sensor hole (not shown in the drawings) is provided below the coupling hole 153R in the medium holding sheet 5R. The sensor hole is provided in a position that corresponds to the sensor portion 24 (refer to FIG. 14). A tag housing portion 155 is a nonpermeable plate-shaped body that covers a part of the front surface 150R, and blocks at least the sensor hole in a front view. The tag housing portion 155 has a rectangular shape that is long in the up-down direction, and is fixed to the front surface 15OR by its three sides except the left side. The tag portion 130 (refer to FIG. 16) is configured to be inserted into the tag housing portion 155 from the left side of the tag housing portion 155 along the front surface 150R. Light can be irradiated into the tag housing portion 155 from the rear side of the medium holding sheet 5R via the sensor hole.

2-4. Notebook 100

As shown in FIG. 16, the notebook 100 includes the tag portion 130 that protrudes to the right from the upper right of the cover sheet 102. The tag portion 130 has a rectangular shape that is long in the up-down direction. Various types of information (for example, title, index, volume number and the like) can be written on the tag portion 130. In the present embodiment, the identification marker 140 that indicates a format of the paper sheet 103 is printed on the rear surface of the tag portion 130. The identification marker 140 has six identification areas that are aligned in the up-down direction. The respective identification areas are distinguished using different colors, namely, uncolored (white) and black. Code information corresponding to the format of the paper sheet 103 is indicated by a combination of the six identification areas (namely, a bar pattern of the identification marker 140).

2-5. Usage Mode of Handwriting Input System 1

Figure 17:
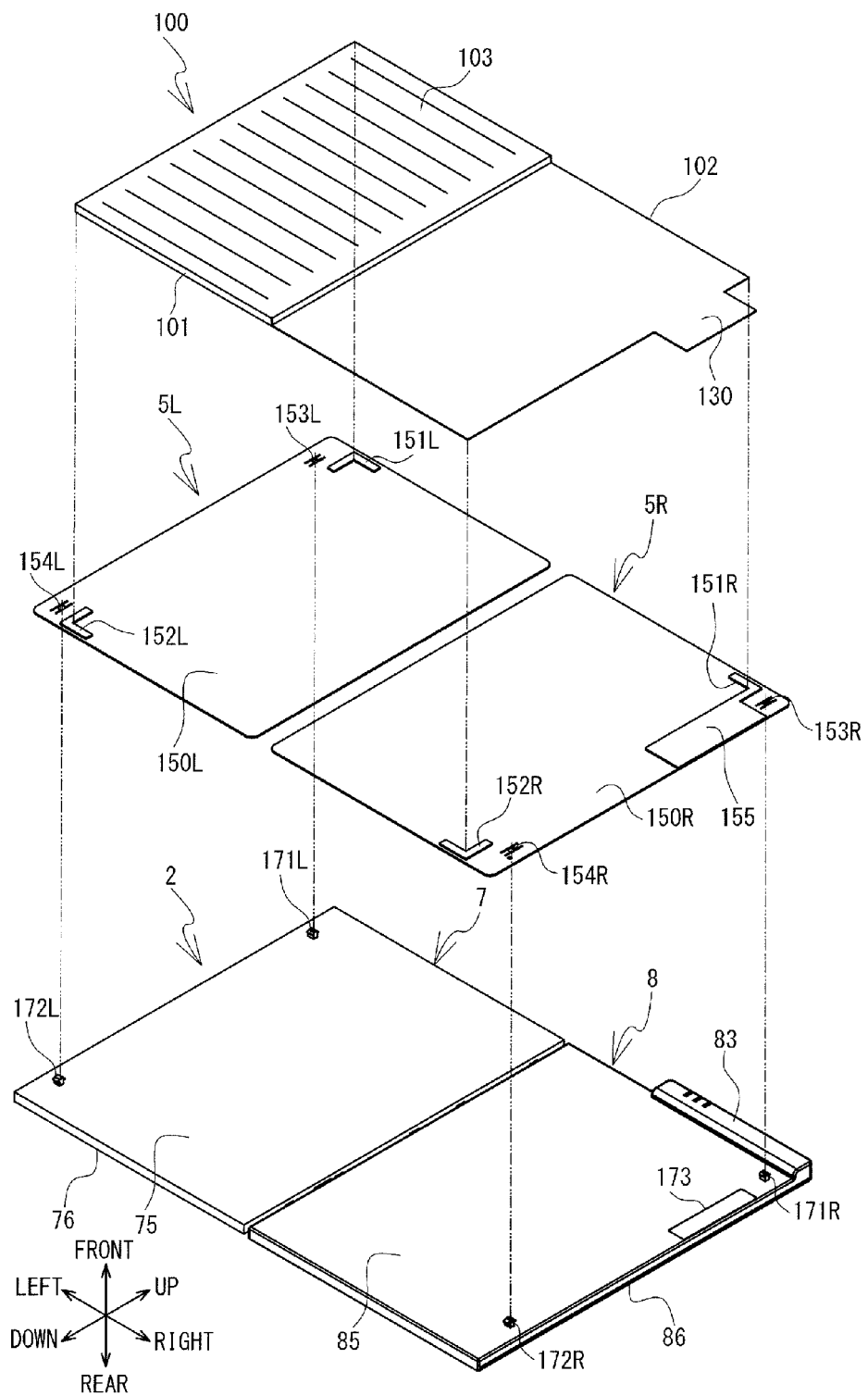
FIG. 17 is a perspective view of the notebook, medium holding sheets and the reading device.
Figure 18:
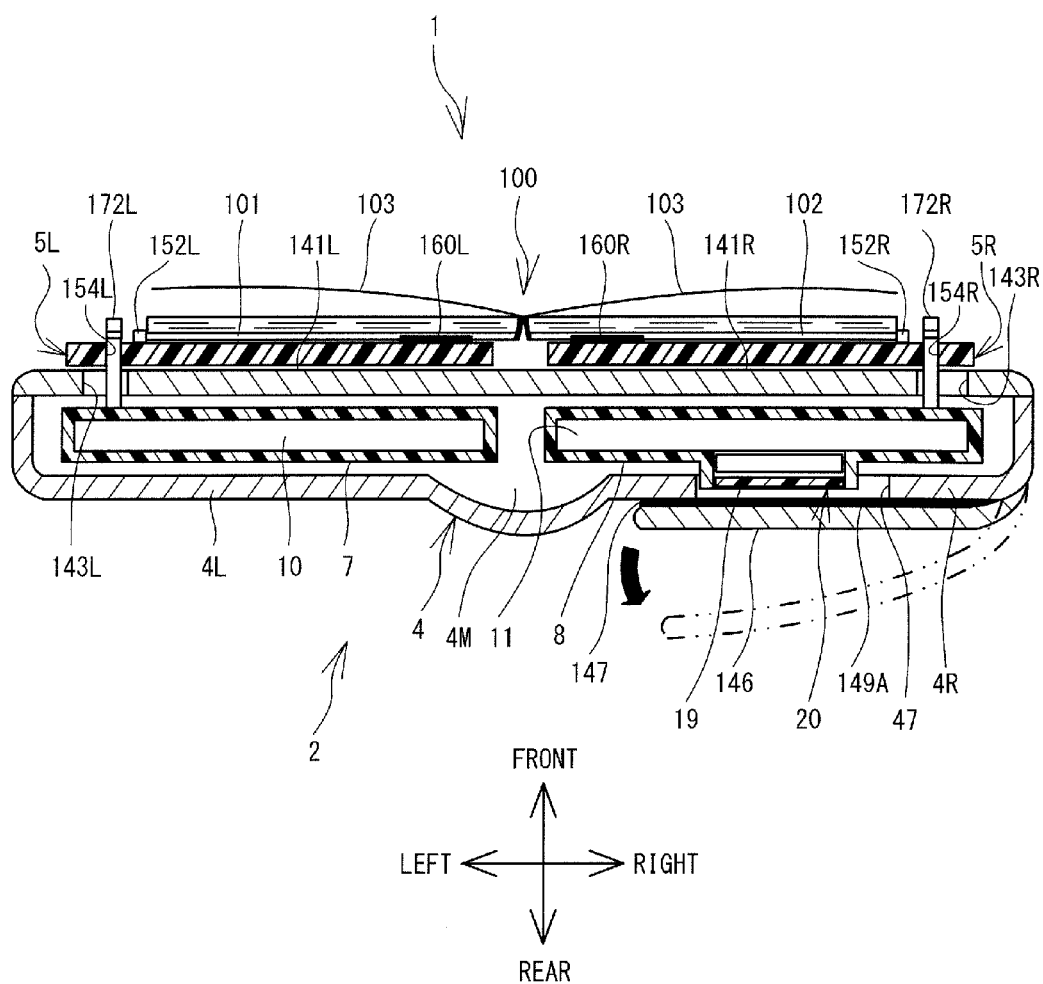
FIG. 18 is a cross-sectional view taken along a line I-I in FIG. 12 as viewed in an arrow direction.

A mode in which the user uses the handwriting input system 1 will be explained. In FIG. 17, the exterior cover 4 is omitted in order to facilitate understanding. In FIG. 18, the opening/closing cover 146 in an open state is shown by a dotted line.

As shown in FIG. 17, the user attaches the medium holding sheets 5L and 5R to the notebook 100. In more detail, the user positions the upper left corner of the cover sheet 101 to the positioning portion 151L and positions the lower left corner of the cover sheet 101 to the positioning portion 152L on the front surface 150L of the medium holding sheet 5L. The user attaches the cover sheet 101 to the front surface 150L using a double-sided adhesive tape 160L (refer to FIG. 18). Thus, the cover sheet 101 is held by the medium holding sheet 5L.

In a similar manner, the user positions the upper right corner of the cover sheet 102 to the positioning portion 151R and positions the lower right corner of the cover sheet 102 to the positioning portion 152R on the front surface 150R of the medium holding sheet 5R. At this time, the user inserts the tag portion 130 into the tag housing portion 155 from the left side. The user attaches the cover sheet 102 to the front surface 150R using a double-sided adhesive tape 160R (refer to FIG. 18). Thus, the cover sheet 102 is held by the medium holding sheet 5R.

Next, the user attaches the medium holding sheets 5L and 5R to the reading device 2. In more detail, the user arranges the medium holding sheets 5L and 5R such that the medium holding sheets 5L and 5R respectively face the front surfaces 141L and 141R (refer to FIG. 10) of the reading device 2. The user inserts the attachment portions 171L and 172L that protrude forward from the front surface 141L into the coupling holes 153L and 154L, respectively. Thus, the medium holding sheet 5L is coupled to the detection device 7. In a similar manner, the user inserts the attachment portions 171R and 172R that protrude forward from the front surface 141R into the coupling holes 153R and 154R, respectively. Thus, the medium holding sheet 5R is coupled to the detection device 8.

According to the above-described procedure, the notebook 100 is attached to the reading device 2 via the medium holding sheets 5L and 5R. As shown in FIG. 18, in a state in which the reading device 2 is opened, the cover sheet 101 is positioned on the front surface 141L such that almost the whole surface of the cover sheet 101 faces the digitizer board 10 in parallel with the digitizer board 10. Almost the whole surface of the paper sheet 103 overlapping with the cover sheet 101 also faces the digitizer board 10 in parallel with the digitizer board 10. The digitizer board 10 can accurately detect the electronic pen 3 that is used to write information on the paper sheet 103 overlapping with the cover sheet 101.

In a similar manner, the cover sheet 102 is positioned on the front surface 141R such that almost the whole surface of the cover sheet 102 faces the digitizer board 11 in parallel with the digitizer board 11. Almost the whole surface of the paper sheet 103 overlapping with the cover sheet 102 also faces the digitizer board 11 in parallel with the digitizer board 11. The digitizer board 11 can accurately detect the electronic pen 3 that is used to write information on the paper sheet 103 overlapping with the cover sheet 102.

For example, if the reading device 2 is inclined or vibrates, an external force that causes the notebook 100 to move back and forth and left and right is applied. The guide holes 142L and 143L of the exterior cover 4 restrict a movement range of the attachment portions 171L and 172L in the front-rear and left-right directions. Even when the external force that causes the notebook 100 to move back and forth and left and right is applied, the attachment portions 171L and 172L restrict the movement range of the cover sheet 101 attached to the medium holding sheet 5L. In a similar manner, the attachment portions 171R and 172R restrict the movement range of the cover sheet 102 attached to the medium holding sheet 5R.

In this way, the notebook 100 attached to the reading device 2 is inhibited from moving significantly as a result of the external force. The positional relationship between the notebook 100 and the digitizer boards 10 and 11 is unlikely to change. Therefore, the state in which the notebook 100 faces the digitizer boards 10 and 11 is maintained. Even when the external force that causes the notebook 100 to move back and forth and left and right is applied, the digitizer boards 10 and 11 can accurately detect the electronic pen 3 that is used to write information on the paper sheet 103.

In conjunction with the movement of the notebook 100, the attachment portions 171L and 172 can move slightly inside the guide holes 142L and 143L. The detection device 7 (namely, the digitizer board 10) moves back and forth and left and right in the same movement direction and by the same movement amount as the notebook 100. In a similar manner, the detection device 8 (namely, the digitizer board 11) moves back and forth and left and right in the same movement direction and by the same movement amount as the notebook 100. The positional relationship between the notebook 100 and the digitizer boards 10 and 11 is unlikely to change. Therefore, the digitizer boards 10 and 11 can accurately detect the electronic pen 3 that is used to write information on the paper sheet 103.

In a state in which the reading device 2 is opened as shown in FIG. 18, the notebook 100 is also in an open state facing the front surfaces 141L and 141R that are continuous on the same plane. At this time, the attachment portions 171L and 172L have moved to the ends on the binding side (right end positions) of the guide holes 142L and 143L, respectively. The attachment portions 171R and 172R have moved, inside the guide holes 142R and 143R, to the ends on the binding side (left end positions) of the guide holes 142R and 143R, respectively. In other words, inside the exterior cover 4, the distance of separation between the detection devices 7 and 8 is at a minimum.

When the reading device 2 is closed, the notebook 100 is also closed. Inside the exterior cover 4, the detection device 7 rotates forward around the axis line O (refer to FIG. 10) along with the movement of the cover sheet 101. The detection device 8 rotates forward around the axis line O along with the movement of the cover sheet 102. At this time, the attachment portions 171L and 172L move to the free end side (the left side) of the guide holes 142L and 143L, respectively, while the digitizer board 10 and the medium holding sheet 5L are maintained in parallel with each other. The attachment portions 171R and 172R move to the free end side (the right side) of the guide holes 142R and 143R, respectively, while the digitizer board 11 and the medium holding sheet 5R are maintained in parallel with each other. In other words, the distance of separation between the detection devices 7 and 8 gradually increases along with the rotation of the detection devices 7 and 8.

Figure 19:
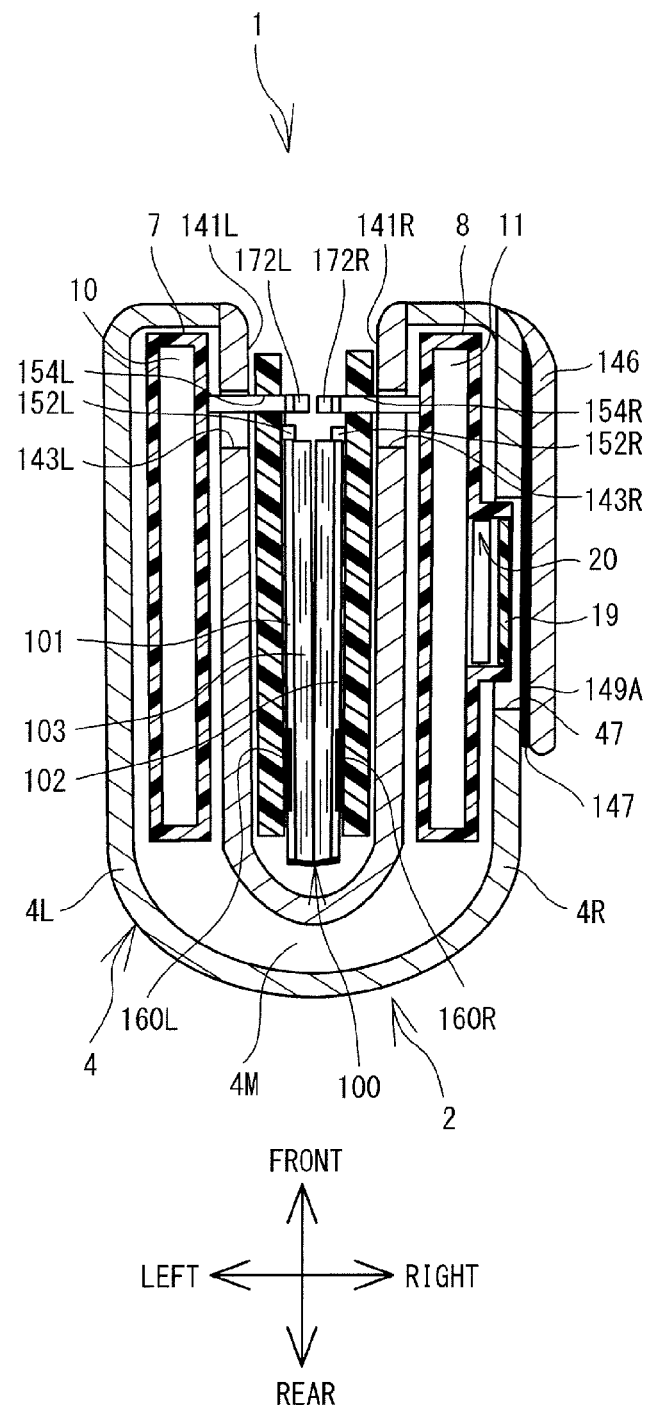
FIG. 19 is a cross-sectional view showing a state in which the reading device shown in FIG. 18 is closed.
Figure 20:
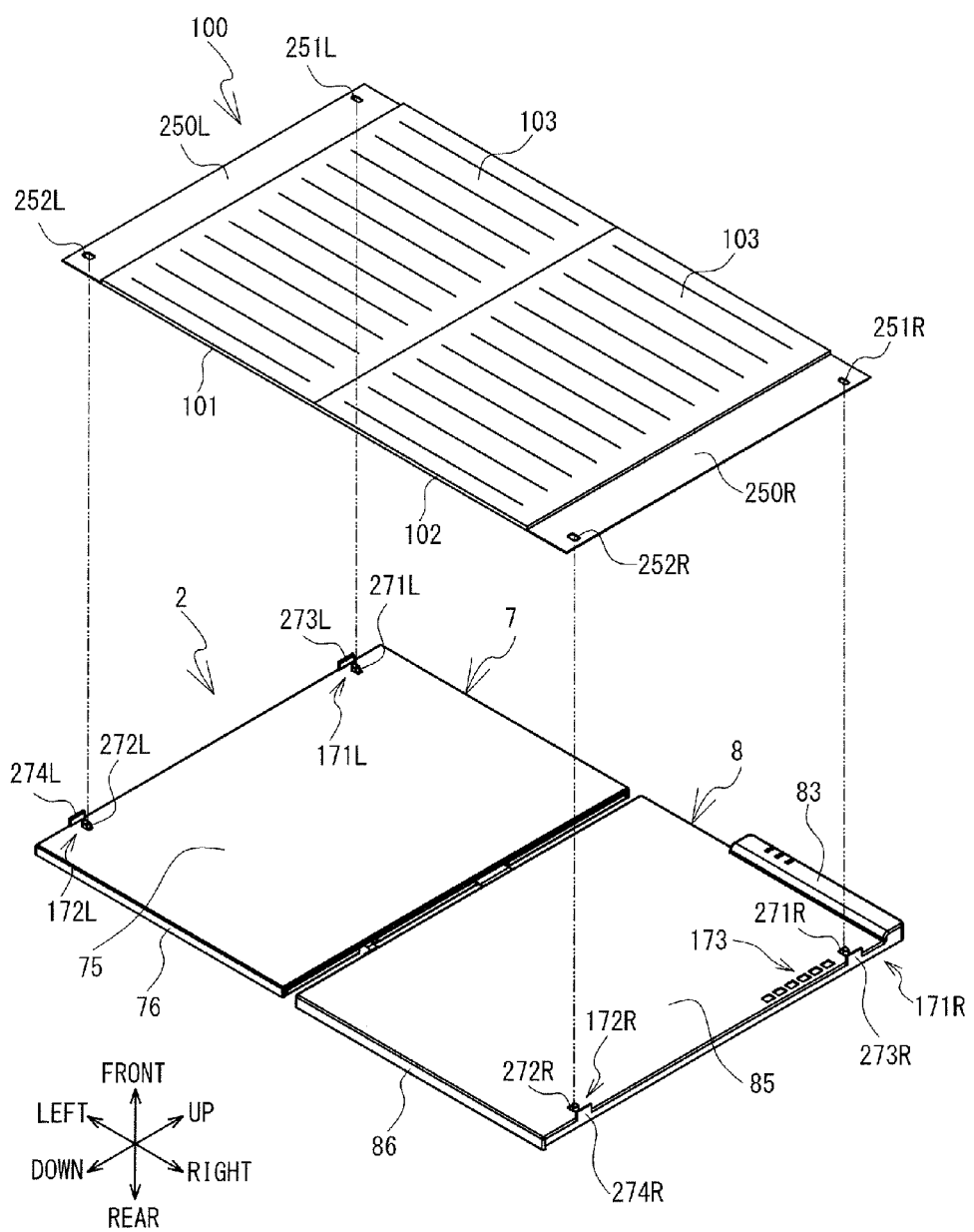
FIG. 20 is a perspective view of the notebook and the reading device according to a modified example.

In a state in which the reading device 2 is closed as shown in FIG. 19, the notebook 100 is also closed between the facing front surfaces 141L and 141R. At this time, the attachment portions 171L and 172L have moved to the ends on the free end side (left end positions) of the guide holes 142L and 143L, respectively. The attachment portions 171R and 172R have moved to the ends on the free end side (right end positions) of the guide holes 142R and 143R, respectively. In other words, inside the exterior cover 4, the distance of separation between the detection devices 7 and 8 is at a maximum.

In this way, in conjunction with the opening and closing of the notebook 100, the digitizer boards 10 and 11 rotate forward around the axis line O while the digitizer boards 10 and 11 remain in a state of facing the cover sheets 101 and 102, respectively. The attachment portions 171L and 172L move inside the guide holes 142L and 143L, respectively, and the attachment portions 171R and 172R move inside the guide holes 142R and 143R, respectively. Thus, the change in the distance of separation between the detection devices 7 and 8 is absorbed. Since the positional relationship between the notebook 100 and the digitizer boards 10 and 11 is unlikely to change, the digitizer boards 10 and 11 can accurately detect the electronic pen 3 that is used to write information on the paper sheet 103.

Since the cover sheet 102 is accurately positioned with respect to the medium holding sheet 5R as described above, the positional relationship between the sensor portion 24 and the tag portion 130 housed inside the tag housing portion 155 is also unlikely to change. Even when the reading device 2 is inclined or vibrates or even when the reading device 2 is opened and closed, the sensor portion 24 can accurately read the identification marker 140 from the tag portion 130

2-6. Examples of Effects of Second Embodiment

In the reading device 2 of the second embodiment, the cover sheet 101 is positioned by the attachment portions 171L and 172L via the medium holding sheet 5L such that almost the whole surface of the cover sheet 101 faces the detection device 7. The cover sheet 102 is positioned by the attachment portions 171R and 172R via the medium holding sheet 5R such that almost the whole surface of the cover sheet 102 faces the detection device 8. Based on the position of the electronic pen 3 detected by the detection device 7, the stroke data that is written on the paper sheet 103 overlapping with the cover sheet 101 is acquired. Based on the position of the electronic pen 3 detected by the detection device 8, the stroke data that is written on the paper sheet 103 overlapping with the cover sheet 102 is acquired. By doing this, the pair of cover sheets 101 and 102 are positioned with respect to the pair of detection devices 7 and 8 that are mutually independent. It is thus possible to suppress the occurrence of positional displacement of the booklet-like notebook 100 when information is being written on the paper sheet 103 that overlaps with either the cover sheet 101 or the cover sheet 102.

The detection devices 7 and 8 are arranged side by side such that facing sides of each of the detection devices 7 and 8 extend in parallel with each other. The detection devices 7 and 8 can rotate around an axis line O extending between the facing sides of each of the detection devices 7 and 8, and can move in a direction in which they approach each other and a direction in which they separate from each other, with the axis line O interposed therebetween. The detection devices 7 and 8 can rotate around the axis line O along with the movement of the cover sheets 101 and 102, and can move in a direction in which they approach each other and a direction in which they separate from each other. Since the detection devices 7 and 8 move along with the movement of the cover sheets 101 and 102, it is possible to further suppress the positional displacement of the notebook 100.

The attachment portions 171L and 172L protrude from the surface that faces the cover sheet 101 in the detection device 7, and can be coupled to the medium holding sheet 5L to which the cover sheet 101 is attached. The attachment portions 171R and 172R protrude from the surface that faces the cover sheet 102 in the detection device 8, and can be coupled to the medium holding sheet 5R to which the cover sheet 102 is attached. The detection devices 7 and 8 can move easily and smoothly along with the cover sheets 101 and 102, via the medium holding sheets 5L and 5R that operate in accordance with the movement of the cover sheets 101 and 102.

The sensor portion 24 can optically read information from the identification marker 140 of the cover sheet 102 that is positioned by the attachment portions 171R and 172R. The reading device 2 can not only acquire information (specifically, the stroke data) that is written on the paper sheet 103, but can also optically acquire information (specifically, the code information) from the identification marker 140 of the positioned cover sheet 102.

The flexible exterior cover 4 houses the detection devices 7 and 8. The exterior cover 4 can protect the pair of detection devices 7 and 8 housed inside the exterior cover 4 against an impact from the outside, for example. The detection devices 7 and 8 can be protected from the outside, and at the same time, can move inside the exterior cover 4 along with each of the cover sheets 101 and 102.

2-7. Modified Examples etc.

Modifications are possible insofar as they do not depart from the spirit and the scope of the present disclosure. For example, in the reading device 2 of a modified example shown in FIG. 20, the notebook 100 is directly attached to the reading device 2 without using the medium holding sheets 5L and 5R. The reading device 2 of this modified example is not provided with the exterior cover 4. The user can open and close the reading device 2 by directly touching the detection devices 7 and 8.

In the notebook 100 of the modified example, the page width (the length in the left-right direction in the present modified example) of the cover sheets 101 and 102 is larger than that of the paper sheet 103. An extended portion 250L is a section of the cover sheet 101 that extends further to the free end side than the paper sheet 103 overlapping with the cover sheet 101. Coupling holes 251L and 252L are respectively provided in the upper corner and the lower corner on the free end side of the extended portion 250L. Coupling holes 251R and 252R are respectively provided in the upper corner and the lower corner on the free end side of an extended portion 250R. Although not shown in the drawings, the identification marker 140 (refer to FIG. 16) is provided below the coupling hole 251R in a rear surface of the extended portion 250R. The sensor portion 24 can read the code information from the identification marker 140 provided on the extended portion 250R, via the reading window 173.

In the reading device 2 of the modified example, the attachment portion 171L includes an insertion pin 271L and a clamping plate 273L. The insertion pin 271L is a pin that protrudes forward from the upper corner on the free end side of the front cover 75. The clamping plate 273L is a plate-shaped member which protrudes upward and which is provided on the free end side adjacent to the insertion pin 271L. Similarly, the attachment portion 172L includes an insertion pin 272L that protrudes from the lower corner on the free end side of the front cover 75, and a clamping plate 274L that is provided on the free end side adjacent to the insertion pin 272L.

The attachment portion 171R includes an insertion pin 271R that protrudes from the upper corner on the free end side of the front cover 85, and a clamping plate 273R that is provided on the free end side adjacent to the insertion pin 271R. The attachment portion 172R includes an insertion pin 272R that protrudes from the lower corner on the free end side of the front cover 85, and a clamping plate 274R that is provided on the free end side adjacent to the insertion pin 272R.

The user inserts the insertion pins 271L and 272L into the coupling holes 251L and 252L, respectively. The upper edge on the free end side of the extended portion 250L is clamped by the insertion pin 271L and the clamping plate 273L. The lower edge on the free end side of the extended portion 250L is clamped by the insertion pin 272L and the clamping plate 274L. The cover sheet 101 is positioned and fixed to the detection device 7.

The user inserts the insertion pins 271R and 272R into the coupling holes 251R and 252R, respectively. The upper edge on the free end side of the extended portion 250R is clamped by the insertion pin 271R and the clamping plate 273R. The lower edge on the free end side of the extended portion 250R is clamped by the insertion pin 272R and the clamping plate 274R. The cover sheet 102 is positioned and fixed to the detection device 8.

The attachment portions 171L, 172L, 171R and 172R may be a slide fixing mechanism that uses hooks, screws, rotation stoppers or movable bodies. The detection devices 7 and 8 may detect the position of the writing tool using another method. The size, the format, the material and the like of the notebook 100 can be changed.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles,

What is claimed is:

1. An information input device that is configured to acquire information that is input on a recording medium using a writing tool, the recording medium being in a booklet form in which a pair of cover sheets and a plurality of paper sheets stacked and arranged between the pair of cover sheets are bound, the information input device comprising:
   a first detecting portion having a first digitizer board and that is configured to detect a position of the writing tool that is in proximity of the first detecting portion, the first detecting portion being a plate-shaped body that is configured to face at least a portion of a surface of a first cover sheet of the pair of cover sheets, the first detecting portion having a first surface on which the first cover sheet is arranged and a second surface on an opposite side of the first surface;

a second detecting portion having a second digitizer board and that is configured to detect a position of the writing tool that is in proximity of the second detecting portion, the second detecting portion being connected to the first detecting portion via wiring and being a plate-shaped body that is configured to face at least a portion of a surface of a second cover sheet of the pair of cover sheets, the second detecting portion having a third surface on which the second cover sheet is arranged and a fourth surface on an opposite side of the third surface;

a first positioning portion that is configured to position the first cover sheet such that at least a portion of the surface of the first cover sheet faces the first detecting portion, the first positioning portion being provided on the first surface, the first positioning portion being configured to position a corner on a free end side of the first cover sheet such that a writable range of the paper sheet overlapping with the first cover sheet corresponds to a detection range of the first detecting portion;

a second positioning portion that is configured to position the second cover sheet such that at least a portion of the surface of the second cover sheet faces the second detecting portion, the second positioning portion being provided on the third surface, the second positioning portion being configured to position a corner on a free end side of the second cover sheet such that a writable range of the paper sheet overlapping with the second cover sheet corresponds to a detection range of the second detecting portion;

a main board that includes:
  a first information acquiring portion that is configured to acquire information that is written on the paper sheet overlapping with the first cover sheet positioned by the first positioning portion, based on the position of the writing tool detected by the first detecting portion; and
  a second information acquiring portion that is configured to acquire information that is written on the paper sheet overlapping with the second cover sheet positioned by the second positioning portion, based on the position of the writing tool detected by the second detecting portion; and a cover portion that includes:
  a first cover portion that is configured to cover the second surface,
  a second cover portion that is configured to cover the fourth surface, the second cover portion being fixed to the fourth surface, and
  a holding portion that is provided facing the first cover portion, the holding portion being configured to hold the first detecting portion that is inserted between the holding portion and the first cover portion, the holding portion being configured to cover the first positioning portion that is disposed between the first detecting portion and the holding portion in a state in which the first detecting portion has been inserted and held between the first cover portion and the holding portion.

2. The information input device according to claim 1, wherein
  the first positioning portion has a concave shape corresponding to the first cover sheet, and
  the second positioning has a concave shape corresponding to the second cover sheet.

3. The information input device according to claim 1, wherein the holding portion is a resin sheet.

4. The information input device according to claim 3, wherein the holding portion is transparent.

5. The information input device according to claim 3, wherein the holding portion has a rectangular shape in which three sides are sealed with respect to the first cover portion, the three sides being different from a side from which the first detecting portion is inserted.

6. The information input device according to claim 1, further comprising a fixing portion that is configured to fix the first cover sheet and the second cover sheet to the first surface and the third surface, respectively.

7. The information input device according to claim 6, wherein the fixing portion is one of an adhesive portion formed by adhesive and a surface fastener.

8. The information input device according to claim 7, wherein the fixing portion includes:
  a first fixing portion that is provided, on the first detecting portion, on an edge that faces the second detecting portion; and
  a second fixing portion that is provided, on the second detecting portion, on an edge that faces the first detecting portion.

9. The information input device according to claim 8, wherein the holding portion is provided in a position where the holding portion does not come into contact with the first fixing portion of the first detecting portion that has been inserted and held between the first cover portion and the holding portion.

10. The information input device according to claim 1, wherein the first detecting portion and the second detecting portion are configured to rotate around an axis line extending between the first detecting portion and the second detecting portion, and are configured to move in a direction in which the first detecting portion and the second detecting portion approach each other and in a direction in which the first detecting portion and the second detecting portion separate from each other, with the axis line interposed therebetween.

11. The information input device according to claim 10, wherein
  the first positioning portion protrudes from the first surface, and is configured to couple to one of the first cover sheet and a member to which the first cover sheet is attached, and
  the second positioning portion protrudes from the second surface, and is configured to couple to one of the second cover sheet and a member to which the second cover sheet is attached.

12. The information input device according to claim 10, further comprising a sensor that is configured to read information optically from an image pattern of the second cover sheet positioned by the second positioning portion.

13. The information input device according to claim 10, further comprising a flexible cover portion that is configured to house the first detecting portion and the second detecting portion.

14. The information input device according to claim 1, further comprising:
  a harness that connects the first detecting portion and the second detecting portion electrically; and
  a processor that is provided in one of the first detecting portion and the second detecting portion, the processor being configured to control the first detecting portion and the second detecting portion.

* * * * *